(12) United States Patent
Tos et al.

(10) Patent No.: US 12,066,354 B2
(45) Date of Patent: Aug. 20, 2024

(54) LEAK DETECTION DEVICE

(71) Applicant: GAZTRANSPORT ET TECHNIGAZ, Saint-Rémy-lès-Chevreuse (FR)

(72) Inventors: Gaël Tos, Saint-Rémy-lès-Chevreuse (FR); Olivier Perrot, Saint-Rémy-lès-Chevreuse (FR); Sébastien Larroque, Saint-Rémy-lès-Chevreuse (FR); Anthony De Faria, Saint-Rémy-lès-Chevreuse (FR); Carlos Da Cunha, Saint-Rémy-lès-Chevreuse (FR); Vincent Fraysse, Saint-Rémy-lès-Chevreuse (FR); David Hassler, Saint-Rémy-lès-Chevreuse (FR)

(73) Assignee: Gaztransport et Technigaz, Saint Remy les Chevreuse (FR)

( * ) Notice: Subject to any disclaimer, the term of this patent is extended or adjusted under 35 U.S.C. 154(b) by 378 days.

(21) Appl. No.: 17/612,352

(22) PCT Filed: May 15, 2020

(86) PCT No.: PCT/EP2020/063718
§ 371 (c)(1),
(2) Date: Nov. 18, 2021

(87) PCT Pub. No.: WO2020/234193
PCT Pub. Date: Nov. 26, 2020

(65) Prior Publication Data
US 2022/0316977 A1    Oct. 6, 2022

(30) Foreign Application Priority Data

May 21, 2019  (FR) ...................................... 1905302

(51) Int. Cl.
*G01M 3/20* (2006.01)
*G01M 3/22* (2006.01)

(52) U.S. Cl.
CPC ............ *G01M 3/205* (2013.01); *G01M 3/226* (2013.01)

(58) Field of Classification Search
CPC .............................. G01M 3/205; G01M 3/226
See application file for complete search history.

(56) References Cited

U.S. PATENT DOCUMENTS

| 3,524,342 A | 8/1970 | Hobbs |
| 4,002,055 A | 1/1977 | Kops |

(Continued)

FOREIGN PATENT DOCUMENTS

| EP | 0064886 A1 | 11/1982 |
| FR | 2691520 A1 | 11/1993 |

(Continued)

*Primary Examiner* — Eric S. McCall
(74) *Attorney, Agent, or Firm* — CALDERON SAFRAN & WRIGHT PC; Corinne Marie Poulien

(57) ABSTRACT

The invention relates to a leak detection device comprising:
a portable leak detection bell-like member comprising a sealing joint and configured to define a detection chamber between the main body and the test zone, the detection bell-like member further comprising a carrying handle which is provided with a control member which can be manually activated to produce a control signal,
a gas suction circuit which is intended to connect the detection chamber to a vacuum pump, the gas suction circuit being provided with a controlled valve which can be switched into an open state to connect the detection chamber to the vacuum pump and a closed state to isolate the detection chamber from the vacuum pump, and (Continued)

a control unit which is configured to switch the controlled valve in response to the control signal.

18 Claims, 13 Drawing Sheets

(56) References Cited

U.S. PATENT DOCUMENTS

| | | | |
|---|---|---|---|
| 4,021,982 | A | 5/1977 | Kotcharian |
| 4,104,905 | A | 8/1978 | Zachary |
| 5,559,282 | A | 9/1996 | Knight et al. |
| 6,450,012 | B1* | 9/2002 | Mayer .................. G01M 3/227 73/49.3 |
| 8,448,498 | B1* | 5/2013 | Kelley .................. G01M 3/329 73/49.3 |
| 11,467,055 | B2* | 10/2022 | Tos ....................... G01M 3/205 |
| 2008/0099075 | A1* | 5/2008 | Martrich .............. F17C 13/123 137/312 |
| 2008/0307858 | A1* | 12/2008 | McManus ............. G01M 3/226 73/1.01 |
| 2021/0364381 | A1* | 11/2021 | Tos ....................... G01M 3/226 |
| 2022/0146359 | A1* | 5/2022 | Jolivet ................... G01M 3/22 |

FOREIGN PATENT DOCUMENTS

| | | |
|---|---|---|
| KR | 20100050128 A | 5/2010 |
| WO | WO2014057221 A2 | 4/2014 |

* cited by examiner

LEAK DETECTION DEVICE

CROSS-REFERENCE TO RELATED APPLICATIONS AND CLAIM TO PRIORITY

This application is a national stage application of International Application No. PCT/EP2020/063718 filed May 15, 2020, which claims priority to French Patent Application No. 1905302 filed May 21, 2019, the disclosures of which are incorporated herein by reference and to which priority is claimed.

FIELD OF THE INVENTION

The invention relates to a leak detection bell-like member which enables leaks of a sealing membrane to be detected, in particular an undulating sealing membrane, for example, in a sealed tank. These sealed tanks may, for example, be sealed and thermally insulating tanks for the storage and/or transport of a fluid, such as a cryogenic fluid.

BACKGROUND OF THE INVENTION

Document KR1020100050128 discloses a method for testing the sealing of a membrane of a sealed and thermally insulating tank for storing LNG. The tank comprises a multi-layer structure and comprises successively, from the outer side to the inner side, a secondary insulating space, a secondary sealing membrane, a primary insulating space and a primary sealing membrane which is intended to be in contact with the liquefied natural gas contained in the tank. The method is intended more specifically to detect leaks via weld seams which enable the metal sheets of the primary sealing membrane to be connected in a sealed manner. The method makes provision for a tracer gas to be injected into the primary insulating space, then for detection equipment which is provided with a tracer gas analyzer to be moved inside the tank, along the weld seams of the primary sealing membrane. In this manner, if the detection equipment detects the presence of the tracer gas, a defect of the sealing of the primary sealing membrane can be concluded. In such a method, the injection of the tracer gas in the primary insulating space is critical since the detection method can only guarantee reliable results if the tracer gas has diffused in a homogeneous manner into all the primary insulating space.

Furthermore, the detection equipment is composed of a tracer gas suction unit and a tracer gas detector. The suction unit is moved using a carriage along the entire length of the weld seam, the carriage being located on a base wall of the tank and the suction unit being fixed to the carriage to be located on a weld seam of a wall adjacent to the base wall. However, it is difficult using this equipment to verify all the weld seams of the tank since the equipment is bulky and needs to be connected to the carriage on the base wall. This equipment is also very slow since the equipment verifies only a small portion of the weld seam simultaneously and it is necessary to modify the assembly of the equipment on the carriage to change the weld seam.

SUMMARY OF THE INVENTION

A notion on which the invention is based is to provide a detection bell-like member or a leak detection device which enables the sealing of a sealing membrane of a tank, and which is reliable and can be readily used in the tank to be tested.

Another notion on which the invention is based is to provide a detection bell-like member or a leak detection device which can be used rapidly, and which permits the sealing of a sealing membrane of a tank to be tested in the minimum of time.

Another notion on which the invention is based is to provide a method for testing the sealing of a membrane which is reliable and rapid to implement.

Some aspects of the invention relate to a leak detection bell-like member, in particular for detecting a leak on a test zone of a sealing membrane of a sealed and thermally insulating tank, the bell-like member comprising a main body which is intended to be arranged on a test zone and a sealing joint which is connected to the main body and which is configured to define a detection chamber between the main body and the test zone, the sealing joint comprising a peripheral sealing lip which is configured to come into contact with the sealing membrane and which has a closed contour which surrounds the detection chamber.

Some aspects of the invention relate to a leak detection device comprising:
an above-mentioned leak detection bell-like member,
a vacuum pump which is connected to the detection chamber to generate a reduced pressure in the detection chamber, and
an analysis equipment item which is connected to the detection chamber to analyze a gas present in the detection chamber.

Some aspects of the invention relate to a method for using such a leak detection device or such a leak detection bell-like member to detect a leak on a test zone of a sealing membrane of a sealed and thermally insulating tank.

To this end, according to a first aspect, the invention provides a leak detection device for detecting a leak in a test zone of a sealing membrane of a sealed and thermally insulating tank, the leak detection device comprising:
a leak detection bell-like member comprising a main body which is intended to be arranged in the test zone and a sealing joint which is connected to the main body and which is configured to define a detection chamber between the main body and the test zone, the sealing joint comprising a peripheral sealing lip which is configured to come into contact with the sealing membrane and having a closed contour which surrounds the detection chamber,
a vacuum pump which is connected to the detection chamber to generate a reduced pressure in the detection chamber, and
an analysis equipment item which is connected to the detection chamber to analyze a gas present in the detection chamber,
wherein the sealing lip is configured to have, at least in a service state in which a reduced pressure is applied in the detection chamber, a pinch portion which pinches between the main body and the sealing membrane over at least a portion of the periphery of the detection chamber or over the entire periphery of the detection chamber.

According to an embodiment, the sealing lip has a flexibility which enables the pinch portion to be formed by means of deformation of the sealing lip in the direction of the detection chamber under the action of the reduced pressure in the detection chamber.

According to an embodiment, the sealing lip also has the pinch portion in an idle state, the pinch portion being arranged to cover all or part of a lower surface of the main body which is intended to be turned toward the sealing membrane.

According to an embodiment, the detection chamber of the leak detection bell-like member has a convex zone which is, for example, circular or polygonal and which is intended to cover a joint zone between four undulating or planar metal sheets.

According to an embodiment, a circle geometrically inscribed in the convex zone has a diameter greater than 68 mm.

According to an embodiment, the detection bell-like member has an elongate shape along a longitudinal axis, the detection chamber of the leak detection bell-like member having an elongate zone which is intended to cover a rectilinear edge of a metal sheet, the convex zone being arranged at an end of the elongate zone.

According to an embodiment, the convex zone is a first convex zone, and the detection chamber of the leak detection bell-like member has a second convex zone which is arranged at an end of the elongate zone opposite the first convex zone along the longitudinal axis.

According to an embodiment, the detection bell-like member has an elongate shape along a longitudinal axis, the convex zone constituting a central portion of the detection chamber of the leak detection bell-like member, the detection chamber having two elongate zones which extend from the convex zone counter to each other along the longitudinal axis.

According to an embodiment, the detection chamber has a circular or convex polygonal shape.

According to an embodiment, a circle geometrically inscribed in the form of the detection chamber has a diameter greater than 68 mm.

The invention also provides a method for using the above-mentioned leak detection device in a test zone which includes a connection zone between four undulating or planar metal sheets of a tank sealing membrane, the method comprising the steps of:
- placing the leak detection bell-like member in the test zone so that the sealing lip comes into contact with the sealing membrane all the way around the test zone and the convex zone covers the connection zone,
- generating a reduced pressure in the detection chamber using the vacuum pump,
- pinching the pinching portion of the sealing lip between the main body and the sealing membrane over at least a portion of the periphery of the detection chamber,
- guiding the gases present in the detection chamber toward the analysis equipment item, and
- analyzing using the analysis equipment item the gas originating from the detection chamber to produce a measurement signal which represents a quantity of at least one gas present in the detection chamber.

According to a second aspect, the invention provides a leak detection bell-like member for detecting a leak in a test zone of a sealing membrane of a tank, the detection bell-like member comprising a main body which is intended to be arranged in the test zone and a sealing joint which is connected to the main body and which is configured to define a detection chamber between the main body and the test zone, the sealing joint comprising a peripheral sealing lip which is configured to come into contact with the sealing membrane and which has a closed contour which surrounds the detection chamber,
wherein the detection bell-like member has an elongate shape in a longitudinal direction and further comprises at least one sighting device which is attached to a longitudinal end of the detection bell-like member, the sighting device having an indicator element which is aligned with a longitudinal center axis of the detection chamber to visually indicate the position of the longitudinal center axis of the detection chamber to an operator.

According to an embodiment, the indicator element comprises a body in the form of a tip or an arrow which is orientated in the alignment of the longitudinal center axis of the detection chamber.

According to an embodiment, the sighting device comprises a light source, the indicator element comprising a directional light beam which is orientated in the alignment of the longitudinal center axis of the detection chamber.

According to an embodiment, the light source is a laser source, for example, a laser diode.

According to an embodiment, the detection bell-like member comprises two sighting devices which are attached to two opposing longitudinal ends of the detection bell-like member and which each have an indicator element which is aligned with the longitudinal center axis of the detection chamber to visually indicate the position of the longitudinal center axis of the detection chamber to an operator.

According to an embodiment, the detection bell-like member further comprises at least one carrying handle which is arranged on an upper surface of the detection bell-like member which is directed in the opposite direction to the sealing lip.

According to an embodiment, the detection bell-like member comprises two carrying handles which are arranged on the upper surface close to the two longitudinal ends of the detection bell-like member.

The invention also provides a method for using an above-mentioned detection bell-like member, on a sealing membrane which comprises a plurality of generally rectangular metal sheets which are welded to each other, wherein the test zone comprises a rectilinear edge of a metal sheet, the method comprising the step of placing the detection bell-like member on the sealing membrane with the indicator element of the or each sighting device being aligned with the rectilinear edge.

Advantageously, the metal sheets are welded to each other with overlaps, the rectilinear edge of the metal sheet being offset in a thickness direction of the sealing membrane relative to an adjacent metal sheet and being arranged to overlap the adjacent metal sheet.

According to a third aspect, the invention provides a leak detection device for detecting a leak in a test zone of a sealing membrane of a sealed and thermally insulating tank, the leak detection device comprising:
- a portable leak detection bell-like member, the leak detection bell-like member comprising a main body which is intended to be arranged in the test zone and a sealing joint which is connected to the main body and which is configured to define a detection chamber between the main body and the test zone, the sealing joint being configured to come into contact with the sealing membrane and having a closed contour which surrounds the detection chamber, the detection bell-like member further comprising a carrying handle which is provided with a control member which can be manually activated to produce a control signal, the control member being positioned on or in the immediate vicinity of the carrying handle so as to be able to be activated by the hand of a user holding the carrying handle,
- a gas suction circuit which is intended to connect the detection chamber to a vacuum pump, the gas suction circuit being provided with a controlled valve which can be switched into an open state to connect the detection chamber to the vacuum pump and a closed state to isolate the detection chamber from the vacuum pump, and a control unit which is configured to switch the controlled valve in response to the control signal.

In this manner, the control member located on or close to the carrying handle enables reliable and easy use by a single user who can place the leak detection device using the carrying handle whilst activating the pressure reduction without needing to release the carrying handle or requiring the presence of another user.

According to an embodiment, the sealing joint comprises a peripheral sealing lip being configured to move into contact with the sealing membrane and having a closed contour which surrounds the detection chamber.

According to an embodiment, the control unit is configured to switch the controlled valve alternately between the open state and the closes state in response to the control signal.

According to an embodiment, the control member is a first control member which can be manually activated to produce a first control signal and the detection bell-like member further comprises a second control member which can be manually activated to produce a second control signal, the control unit being configured to switch the controlled valve into the open state in response to the first control signal and into the closed state in response to the second control signal.

According to an embodiment, the carrying handle is a first carrying handle and the detection bell-like member further comprises a second carrying handle which is provided with the second control member.

According to an embodiment, the or each carrying handle is arranged on an upper surface of the detection bell-like member, which surface is directed in the opposite direction to the sealing lip.

According to an embodiment, the controlled valve is carried by the detection bell-like member.

According to an embodiment, the device further comprises an analysis equipment item which is connected to the detection chamber by the gas suction circuit and a pressure sensor which is arranged to supply to the control unit a measurement signal which is representative of a pressure applied in the detection chamber, and the control unit is configured to determine that the pressure applied in the detection chamber is lower than a predefined pressure threshold and to activate the analysis equipment item in response.

According to an embodiment, the pressure sensor is arranged on the detection bell-like member and is in fluid communication with the detection chamber.

According to an embodiment, the analysis equipment item comprises a mass spectrometer.

According to an embodiment, the gas suction circuit comprises a flexible pipe which is connected to a gas outlet of the detection bell-like member.

According to an embodiment, the gas suction circuit further comprises a three-way connection whose channels are connected to the flexible pipe, a vacuum pump, and an analysis equipment item, respectively.

According to an embodiment, the device further comprises a movable carriage which carries the control unit, the vacuum pump, and the analysis equipment item.

According to an embodiment, the device further comprises a flexible electrical cable which connects the control unit to the detection bell-like member to transport the control signal(s) and/or an electrical power supply.

According to an embodiment, the controlled valve is a three-way valve which is configured to place the detection chamber in communication with the ambient atmosphere in the closed state.

According to a fourth aspect, the invention provides a leak detection method for detecting a leak in a test zone of a sealing membrane of a tank using a leak detection bell-like member, the leak detection bell-like member comprising a main body and a sealing joint which is connected to the main body and which is configured to define a detection chamber between the main body and the sealing membrane, the sealing joint comprising a peripheral sealing lip which is configured to come into contact with the sealing membrane and which has a closed contour which surrounds the detection chamber, the leak detection bell-like member further comprising a mechanical pressure means which is carried by the main body and which comprises at least one pressure element which is configured to apply to a portion of the sealing lip a pressure which is directed toward the membrane when the main body is arranged in the test zone, the sealing membrane comprising a plurality of undulating or planar metal sheets which are welded to each other, the method for testing the sealing comprising the steps involving:

arranging the detection bell-like member against the sealing membrane by positioning the detection chamber in line with at least one weld seam between a first metal sheet and a second metal sheet, and positioning the pressure element to apply pressure to a portion of the sealing lip which extends across the weld seam, reducing the pressure in the detection chamber using a vacuum pump, guiding the gaseous phase contained in the detection chamber to an analysis equipment item to detect a gas present in the detection chamber.

According to embodiments, such a method may have one or more of the following features.

According to an embodiment, the detection chamber of the leak detection bell-like member has a convex zone, the pressure element for applying the pressure to the portion of the sealing lip which extends across the weld seam being arranged at the periphery of the convex zone.

According to an embodiment, the weld seam between the first metal sheet and the second metal sheet is a first weld seam and the pressure element is a first pressure element and the convex zone of the detection chamber is also placed in line with a second weld seam which joins the first or second metal sheet to a third metal sheet, the mechanical pressure means further comprising a second pressure element which is positioned to apply pressure to a portion of the sealing lip which extends across the second weld seam.

According to an embodiment, the metal sheets are substantially rectangular and the detection chamber is positioned in line with a connection zone between the first, second, third metal sheets and a fourth metal sheet, the connection zone further comprising a third weld seam which connects the first or second metal sheet to the fourth metal sheet, the mechanical pressure means further comprising a third pressure element which is positioned to apply the pressure to a portion of the sealing lip which extends across the third weld seam.

According to an embodiment, the detection bell-like member has an elongate shape along a longitudinal axis, the detection chamber of the leak detection bell-like member having an elongate zone which is intended to cover a rectilinear edge of a metal sheet, the convex zone being arranged at an end of the elongate zone.

The pressure element(s) may be produced in different manners. According to an embodiment, the pressure element comprises a rod which is mounted so as to be able to be moved in translation relative to the main body, a spring which urges the rod toward the sealing lip and an abutment element which is fixed to one end of the rod, and which moves into abutment against the sealing lip under the action of the spring.

According to an embodiment, the pressure element comprises a first and a second rod which are mounted so as to be able to be moved in translation relative to the main body remote from each other, springs urging the rods toward the sealing lip and an elongate abutment element which has a first end fixed to one end of the first rod and a second end fixed to one end of the second rod, the elongate abutment element moving into abutment against the sealing lip under the action of the springs.

According to an embodiment, the pressure element comprises a plurality of adjustment elements which are mounted on the main body, and which form a row, an adjustment element comprising a rod which extends perpendicularly in the direction of the sealing lip, the rod having an end whose position can be controlled in a longitudinal direction of the rod so as to come into contact with the sealing lip.

According to an embodiment, the pressure element further comprises a distribution base which is arranged between the ends of the rods and the sealing lip.

According to other advantageous embodiments, such a bell-like member may have one or more of the following features.

According to an embodiment, the detection bell-like member comprises:
a mechanical pressure means which is carried by the main body and which comprises at least one pressure element which is configured to apply to a portion of the sealing lip a pressure which is directed toward the membrane when the main body is arranged on the test zone.

As a result of these features, the detection bell-like member may be placed rapidly in a test zone so that the sealing joint can form a detection chamber over the entire test zone. Furthermore, the mechanical pressure means enables the sealing lip to be pressed on one or more portions, in particular at locations where there is a risk of the sealing joint becoming detached from the sealing membrane, to make the detection of any leak by the detection bell-like member more reliable.

Advantageously, the detection bell-like member is capable of detecting a tracer gas which has been injected for the requirements of the test, for example, helium, or a gas of the ambient air. According to a possibility afforded by the invention, this tracer gas is not necessarily injected into the zone for which the sealing is tested, it may be in the zone via another means. The term "ambient air" is intended to be understood to be a gaseous phase which has a composition similar to dry ambient air, that is to say, comprising approximately 78% nitrogen oxide, 21% oxygen, 0.9% argon and rare gases and volatile organic compounds which are capable of being emitted via an adhesive which is used in the thermally insulating barrier, or which originates from the insulating solid materials.

Furthermore, because of the leak detection bell-like member according to the invention, it is now possible to obtain, without difficulty, an absolute pressure less than 100 Pa in the detection chamber, for example, in the order of from 50 to 60 Pa (0.5-0.6 mbar).

According to an embodiment, the pressure element is a resiliently deformable element which applies a pressure to the portion of the sealing lip by means of resilient deformation.

In this manner, the resilience of the pressure element enables, in the event of the resilient deformation thereof, a restoring force to be applied to the sealing lip in the direction toward the sealing membrane.

According to an embodiment, the pressure element is orientated perpendicularly to the contour of the peripheral sealing lip.

According to an embodiment, the sealing lip has a service state, when a reduced pressure is applied in the detection chamber, and a pinch portion of the sealing lip is maintained between the main body and the sealing membrane over at least a portion of the periphery of the detection chamber, advantageously over the entire periphery of the chamber.

According to an embodiment, the leak detection bell-like member has an elongate shape having a length greater than or equal to 0.5 m, preferably greater than or equal to 1 m, more preferably greater than or equal to 2 m. Furthermore, the leak detection bell-like member may have a width between 10 and 20 centimeters (cm), preferably between 14 cm and 16 cm.

With regard to the weight of such a detection bell-like member, it may be between 3 kilos and 25 kilos, preferably between 5 and 10 kilos, depending in particular on the materials used, the length thereof and the width thereof.

According to an embodiment, the mechanical pressure means comprises a plurality of pressure elements which are configured to apply a pressure to a plurality of portions of the sealing lip, portions being located at the two ends of the sealing lip in a longitudinal direction.

According to an embodiment of the invention, portions of the sealing lip pressed by the mechanical pressure means are located at the two ends of the sealing lip in a longitudinal direction, that is, at the two ends of the bell-like member considering that it has a generally longitudinal shape.

In this manner, the mechanical pressure means applies a pressure to different zones where there is a risk of the joint becoming detached, that is, the ends of the sealing joint.

According to an embodiment, the sealing lip comprises at least one notch which has a shape which corresponds to that of an undulation of the membrane, the notch being intended to span the undulation.

According to an embodiment, the sealing lip comprises at least two notches, for example, three notches.

As a result of these features, it is possible to place the detection bell-like member on a sealing membrane which comprises undulating metal sheets, the notch(es) enabling the bell-like member to span the undulations.

The leak detection bell-like member is thus capable, when it is used in a membrane zone which comprises waves, of testing the welding zones present in a plurality of waves, for example, at least three (3) waves and up to almost ten waves. It is also possible to envisage associating several detection bell-like members beside each other or one after the other to form a larger test zone length. According to an embodiment, a single vacuum pump can be used to generate the reduced pressure required in leak detection bell-like members which are associated with each other.

According to an embodiment, a portion of the sealing lip pressed by the mechanical pressing means is located at a base of the notch.

As a result of this feature, it is possible to place the detection bell-like member on a sealing membrane which comprises undulating metal sheets, the notch(es) enabling the bell-like member to span the undulations.

In this manner, the mechanical pressure means applies a pressure to a zone where there are risks of detachment of the sealing joint because of a change in the gradient of the notch.

According to an embodiment, the mechanical pressure means comprises a plurality of pressure elements which are configured to apply a pressure to a plurality of portions of the sealing lip, portions being located at the bases of the notch or notches.

In this manner, the mechanical pressure means applies a pressure to different zones where there is a risk of detachment of the joint, that is, the base of the notch or notches.

According to an embodiment, the portion of the sealing lip is located on a peak of the notch.

According to an embodiment of the invention, all the portions of the sealing lip located at the bases of the notch are pressed by the plurality of pressure elements of the mechanical means.

According to an embodiment, at least one of, a portion of, or the pressure elements comprise(s) a curved plate, of which at least one of the ends moves into abutment with the base of a notch.

Advantageously, at least one of, a portion of, or the pressure elements comprise(s) a curved plate, the two ends of which move into abutment with the base of two contiguous notches.

As a result of this feature, the positioning of the leak detection bell-like member is made easier since the curved plate enables the adequate pressurizing of the notches of the sealing lip on the two contiguous waves of the membrane, regardless of any slight variations of the distance between these two contiguous waves or the approximate positioning of the leak detection bell-like member on the undulating membrane by one or more operators.

According to an embodiment, a support element extends over the entire length of the main body above it and is fixed to the main body.

According to an embodiment, the curved plates are distributed over the sealing lip and are fixed to the support element using fixing means.

According to an embodiment, the curved plates can be resiliently deformed so as, when they are deformed, to apply a resilient return force to the sealing lip.

According to an embodiment, the fixing means comprise a plurality of pins, the pins each comprising a rod which is movably mounted on a body, the rod comprising an end which is in abutment against one of the curved plates, the body being fixed to the support element, and also comprising a spring which connects the rod to the body, the spring acting between the body and the rod to position the end of the rod in abutment against the curved plate and the spring being configured to apply a return force to the curved plate so that the curved plate presses the sealing lip against the base of an undulation.

According to an embodiment, the mechanical pressure means comprises a plurality of end pressure elements, the end pressure elements being located at the two ends of the sealing lip in a longitudinal direction, that is, at the two ends of the bell-like member, given that it has a longitudinal shape.

According to an embodiment, at least one of or the end pressure elements comprise(s) an end pin, the end pin comprising a rod which is mounted so as to be movable on a body, an elongate abutment element being fixed to an end of the rod, the elongate abutment element being in abutment against the sealing lip, and the body being fixed to the support element, the end pin also comprising a spring which connects the rod to the body, the spring acting between the body and the rod to position the elongate abutment element against the sealing lip, the spring being configured to apply a restoring force to the elongate abutment element so that the elongate abutment element presses the sealing lip against the zone to be tested.

According to an embodiment, the second end is provided with an elongate abutment element, the elongate abutment element being configured to transmit the resilient restoring force to a zone of the sealing lip corresponding to a length of the elongate abutment element.

According to an embodiment, the second end of a first end pin and the second end of a second end pin adjacent to the first end pin are fixed to each other using an elongate abutment element.

According to an embodiment, at least one of or the end pressure elements comprise(s) a plurality of adjustment elements which form a row of elements, the adjustment element comprising a rod which extends in the direction of the sealing lip and an end which can be controlled in a longitudinal direction of the rod to come into contact with the sealing lip after control.

According to an embodiment, the pressure element comprises a curved plate which comprises a cylindrical sleeve at one of the ends thereof in contact with the sealing lip.

In this manner, the cylindrical sleeve enables the pressure of the mechanical pressure means to be uniformly applied to a portion of the sealing lip.

According to an embodiment, the sealing joint comprises a casing which at least partially covers the main body, and which is fixed to the main body, the peripheral sealing lip being connected to the casing so as to extend it and being curved in the opposite direction to the main body.

According to an embodiment, the cylindrical sleeve comprises a length direction, the length direction of the cylindrical sleeve being substantially orthogonal to the casing so that the cylindrical sleeve extends from the casing to an end of the sealing lip.

According to an embodiment, the sealing lip comprises a curved portion which is substantially orthogonal to the casing, the curved portion having a dimension in cross section greater than or equal to 1 cm, preferably greater than or equal to 1.5 cm, more preferably greater than or equal to 2 cm.

According to an embodiment, the sealing joint is produced from an elastomer material which has a hardness between 20 and 50 Shore A.

As a result of these features, the sealing joint is composed of a material which is sufficiently flexible to be deformed by the mechanical pressure means.

According to an embodiment, the elastomer material of the sealing joint is selected from polyurethane elastomer and ethylene propylene diene monomer (EPDM). The elastomer material of the sealing joint may also be made of silicone, nitrile, or Viton®.

According to an embodiment, the main body comprises a rigid core, and the sealing joint comprises a casing which is applied hermetically against a peripheral wall of the rigid core.

According to an embodiment, the rigid core comprises a recess on a lower surface which is intended to be turned toward the test zone.

According to an embodiment, the rigid core comprises a channel which connects the recess to an upper surface of the rigid core to connect a vacuum pump.

According to an embodiment, the leak detection bell-like member is orientated with respect to the test zone so that a length of the leak detection bell-like member is superimposed with the test zone.

According to an embodiment, the test zone is a portion of a weld seam of the sealing membrane.

In this manner, the leak detection bell-like member enables it to be verified whether there is no defect on the weld seam which could bring about a leak in the sealing membrane.

According to an embodiment, the test zone is located on an undulating sealing membrane.

According to an embodiment, the peripheral sealing lip is shaped to adapt to the geometry of the at least one undulation.

According to an embodiment, the portion of the weld seam is passed through by at least two undulations, for example, three undulations, parallel with the membrane and the peripheral sealing lip is conformed to adapt to the geometry of the undulations.

According to an embodiment, the peripheral sealing lip comprises at least two notches which have a shape which corresponds to that of an undulation of the membrane which protrudes toward the inner side of the tank, the notches being intended to span the undulation.

According to an embodiment, at least one undulation of the membrane protrudes toward the inner side of the tank, the detection bell-like member being arranged against the membrane so that the notches span the undulation.

According to an embodiment, the peripheral sealing lip comprises at least two protruding zones which have a shape which corresponds to that of an undulation of the membrane which protrudes toward the outer side of the tank.

According to an embodiment, the detection bell-like member is arranged against the membrane so that the protruding zones are inserted in the undulation.

According to an embodiment, the pressure in the detection chamber is reduced as far as an absolute pressure value between 10 and 1000 Pa, preferably less than 100 Pa absolute.

According to an embodiment, the gaseous phase is analyzed for a time period greater than or equal to 5 seconds.

According to an embodiment, the variable which is representative of a quantity of gas in the gaseous phase is compared with a threshold and it is determined that the sealing of the weld seam portion is defective when the representative variable is greater than the threshold.

According to embodiments, the analysis equipment item is configured to detect a tracer gas or to detect a component of the ambient air.

BRIEF DESCRIPTION OF THE DRAWINGS

The invention will be better understood and other objectives, details, features and advantages thereof will be appreciated more clearly from the following description of a number of specific embodiments of the invention, given purely by way of non-limiting illustration with reference to the appended drawings, in which.

DETAILED DESCRIPTION OF THE PREFERRED EMBODIMENT(S)

A leak detection device will be described below and can be used to detect leaks in different sealed assemblies, for example, a welded assembly. In the examples below, the welded assembly is a sealing membrane for a fluid tank.

Figure 1:
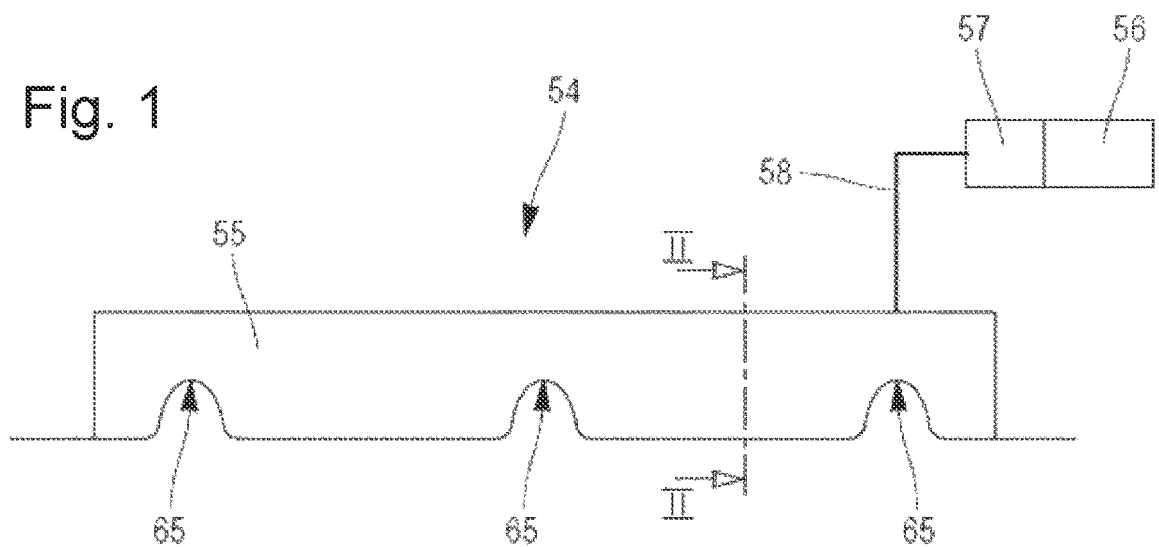
FIG. 1 is a schematic view of a leak detection device according to a first embodiment.

During the step of testing the sealing which enables the sealing of the weld seams of a membrane 5, 8 to be verified, a leak detection device 54 is used, as illustrated in FIG. 1.

The leak detection device 54 comprises a detection bell-like member 55 which is intended to be arranged against the inner face of the membrane 5, 8 opposite a portion of the weld seam to be tested.

The detection bell-like member 55 has an elongate shape and has a length between 0.5 and 4 m, for example, in the order of 1 m. The length of the detection bell-like member 55 is advantageously as large as possible to verify the sealing of a larger zone during only one test. However, the selection of this length of the bell-like member can be adapted in accordance, on the one hand, with the dimensions of the membrane 5, 8 to be tested and, on the other hand, in accordance with the maneuverability thereof by a minimum number of operator(s), preferably by a single operator. An elongate shape is particularly suitable for testing an assembly of rectangular metal sheets, wherein the weld seams substantially follow the rectangular edges of the metal sheets.

Figure 2:
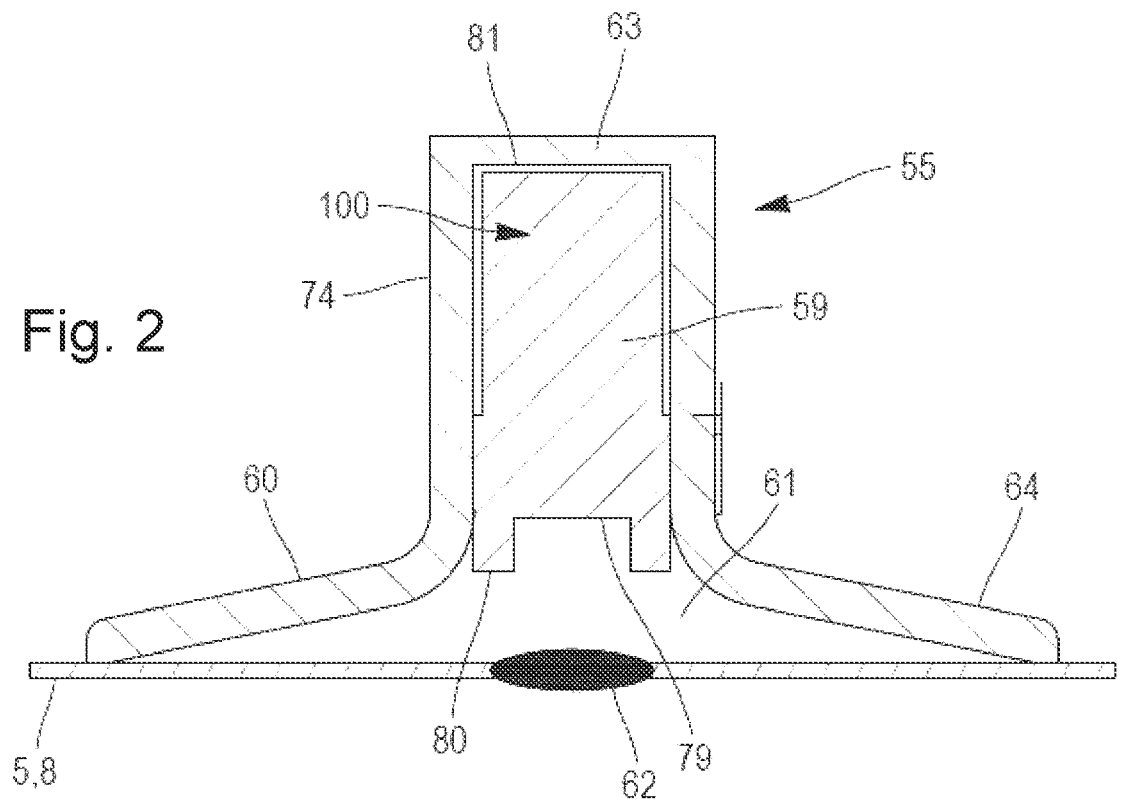
FIG. 2 is a cross section along the plane Il-Il of the detection bell-like member of the leak detection device of FIG. 1.

As illustrated in FIG. 2, the detection bell-like member 55 comprises a rigid main body 100 and a flexible sealing joint 60 which are fixed to each other and which are arranged to define with the membrane 5, 8 to be tested a sealed detection chamber 61 which is arranged opposite the portion of the weld seam 62 to be tested.

Returning to FIG. 1, it can be seen that the leak detection device 54 also comprises an analysis equipment item 56 which is connected to the detection chamber 61 and which enables a predefined gas to be detected, for example, a tracer gas or a gas of the ambient air present at the other side of the welded assembly to be tested. As soon as the analysis equipment item 56 detects the predefined gas in a quantity greater than a threshold, it can be concluded that there is a sealing defect of the portion of the weld seam 62 tested. According to an embodiment, the analysis equipment item 56 is a mass spectrometer.

The leak detection device 54 also comprises a vacuum pump 57 which is associated with the analysis equipment item 56. The vacuum pump 57 is connected, on the one hand, to the detection chamber of the detection bell-like member 55 to enable the pressure in the detection chamber to be reduced and, on the other hand, to the analysis equipment item 56 to guide the gas contained in the detection chamber 61 to the analysis equipment item 56.

The vacuum pump 57 is connected to the detection bell-like member 55 via a pipe 58 which is preferably flexible. The pipe 58 is connected to a channel which is provided in the main body 100 and which opens in the detection chamber 61.

Figure 3:
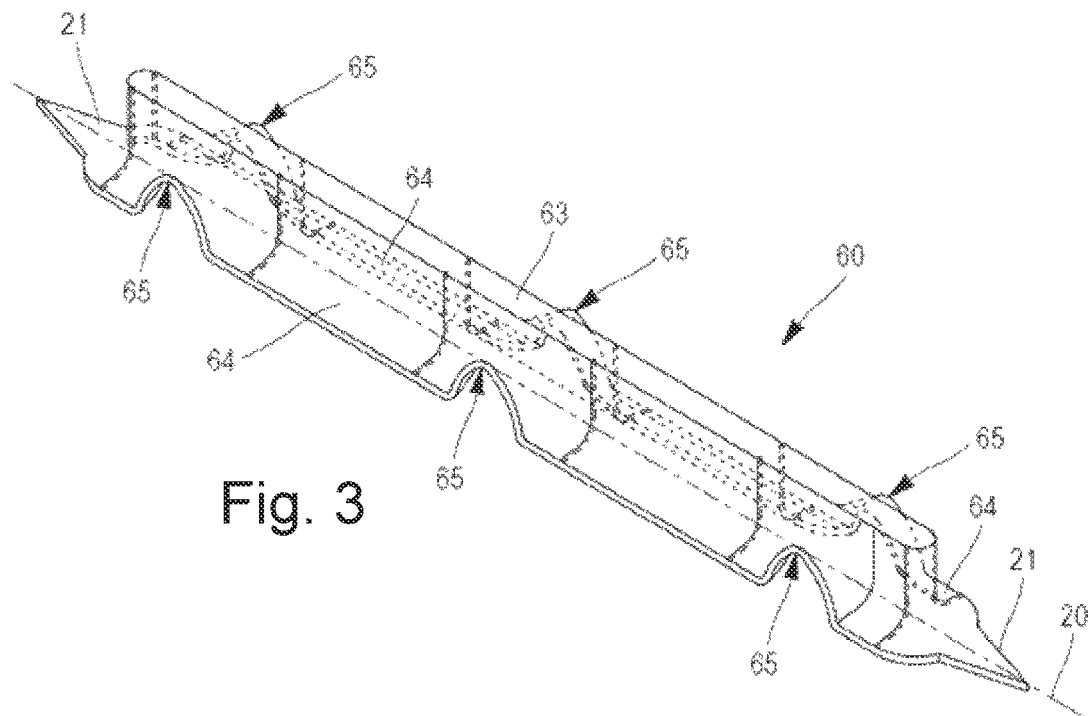
FIG. 3 is a perspective view of a sealing joint according to a first embodiment.

As illustrated in FIGS. 2 and 3, the main body 100 comprises a rigid core 59 and the sealing joint 60 comprises a casing 63 which conforms to the shape of the rigid core 59 and a peripheral sealing lip 64 which extends the casing 63 in a downward direction. The casing has a base 63 which covers the upper surface of the rigid core 59 and a peripheral wall 74 which conforms to the periphery of the rigid core 59. The base 63 has at least one hole which is not illustrated and to which the pipe 58 which is connected to the vacuum pump 57 is connected in a sealed manner. The rigid core 59 comprises on the lower surface 80 thereof a recess 79 over the entire length of the rigid core 59. When the pressure in the detection chamber 61 is reduced, despite a lowering of the rigid core 59 toward the membrane 5, 8 as a result of a deformation of the sealing lip 64, the recess 79 enables the test zone 62 still to be located in fluid contact with the detection chamber 61. Furthermore, the rigid core 59 also comprises a channel 82, which is not illustrated in FIG. 2 since it is present only in a plane which extends in the region of the pipe 58, enabling the recess 79 to be connected to an upper surface 81 of the rigid core 59. The channel 82 enables the detection chamber 61 to be placed in communication with the vacuum pump 57 and the analysis equipment item 56 via the pipe 58

The peripheral sealing lip 64 is curved toward the outer side of the detection bell-like member 55 and is thus configured to flex and to press against the membrane 5, 8 when the pressure in the sealed chamber 61 is reduced. In other words, the peripheral sealing lip 64 has a cross section which is generally L-shaped.

The portion which is curved toward the outer side of the peripheral sealing lip 64 has a width in the order of from 15 to 40 mm. The peripheral sealing lip 64 is conformed to be adapted to the geometry of the membrane 5, 8 along the weld seam to be tested. In FIG. 3, therefore, the peripheral sealing lip 64 comprises notches 65 which have a shape which corresponds to that of the undulations of the membrane 5, 8 that the detection bell-like member 55 is intended to span when it is in position against the portion of the weld seam 62 to be tested.

The sealing joint 60 is advantageously made from an elastomer material which has a hardness between 20 and 50 Shore A. The sealing joint is, for example, made from elastomer polyurethane, EPDM rubber, silicone, nitrile, or Viton®.

FIG. 3 also illustrates the longitudinal center axis 20 of the detection chamber 61 surrounded by the peripheral sealing lip 64. During operation, it is desirable to center the detection chamber 61 correctly on the weld seam to be verified, in particular because of the fact that the detection chamber 61 can be relatively narrow. To this end, the detection bell-like member 55 may comprise a sighting device which is produced, in FIG. 3, in the form of two indicator points 21 which are placed at the two longitudinal ends of the detection bell-like member, and which are orientated in alignment with the longitudinal center axis 20. In a variant, only one of these two indicator points 21 could be provided. The indicator points 21 are in this instance produced in one piece with the peripheral sealing lip 64, which ensures that the indicator points 21 are in the immediate vicinity of the membrane 5, 8 and therefore limits the risks of a parallax sighting error. The indicator points 21 may, however, be produced in other manners, for example, in the form of connected components. The indicator points 21 may be fixed to other portions of the detection bell-like member 55.

Figure 21:
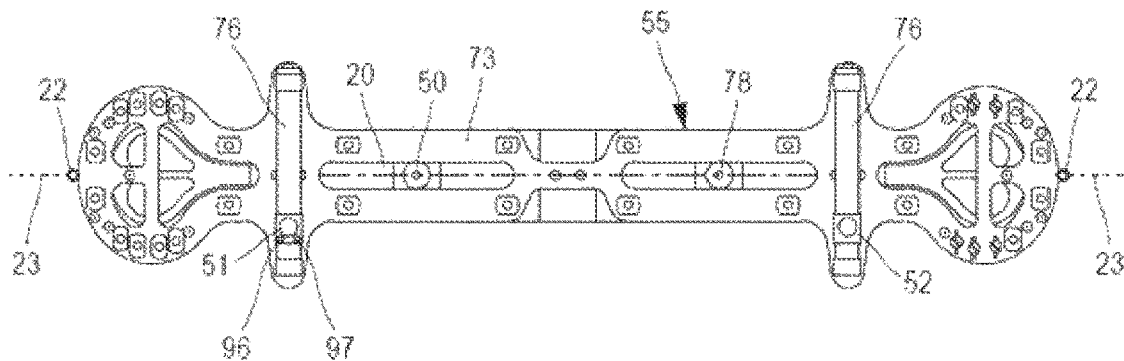
FIG. 21 is a plan view of the leak detection bell-like member of FIG. 13, also illustrating an optical sighting device.

FIG. 21 illustrates an optical sighting device which is constituted by two laser diodes 22 which are attached to the two longitudinal ends of the detection bell-like member 55 and which transmit light beams 23 which are also orientated in alignment with the longitudinal center axis 20. In a variant, only one of the two laser diodes 22 could be provided. The laser diode 22 may be placed on the peripheral sealing lip 64 or above the peripheral sealing lip 64, for example, on a support element 73 which will be described below. Preferably, in this instance, the light beam 23 is inclined slightly downward to strike the membrane 5, 8 and thus to limit the risks of a parallax sighting error.

Figure 4:
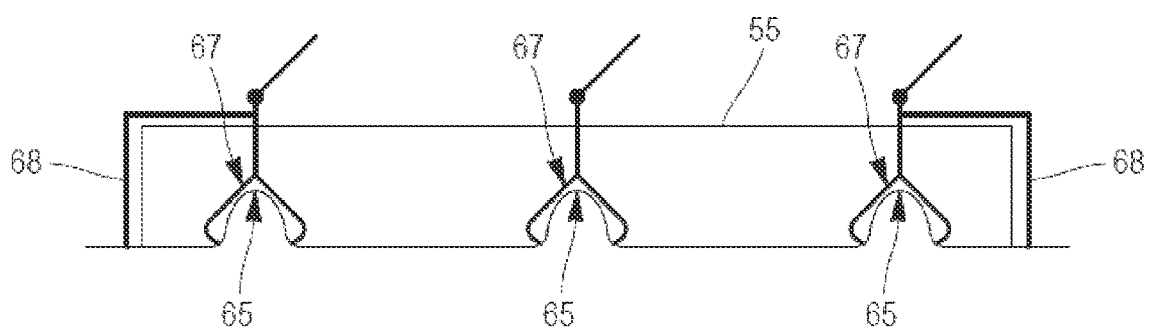
FIG. 4 is a schematic view of a variant of a leak detection device in which the detection bell-like member is provided with a clamping system.

In an embodiment which is illustrated schematically in FIG. 4, the detection bell-like member 55 is further provided with a mechanical pressure means 66 which in this embodiment is a clamping system 66 which is capable of pressing the peripheral sealing lip 64 against the membrane 8 to be tested to ensure the sealing of the detection chamber 61. The clamping system 66 comprises in this instance a set of pincers 67 in the region of each of the notches 65 of the peripheral sealing lip 64. Each set of pincers 67 comprises two branches which are arranged at one side and the other of the notch 65, respectively, and which are configured to apply a clamping force of the peripheral sealing lip 64 against the membrane 8. Advantageously, the branches are configured to clamp the peripheral sealing lip 64 against the sealing membrane, close to the base of the undulation.

Furthermore, in the embodiment illustrated, the clamping system 66 further comprises in the region of each of the longitudinal ends of the detection bell-like member 55, a movable finger 68 which is configured to press one of the longitudinal ends of the peripheral sealing lip 64 against the membrane 8.

Figure 5:
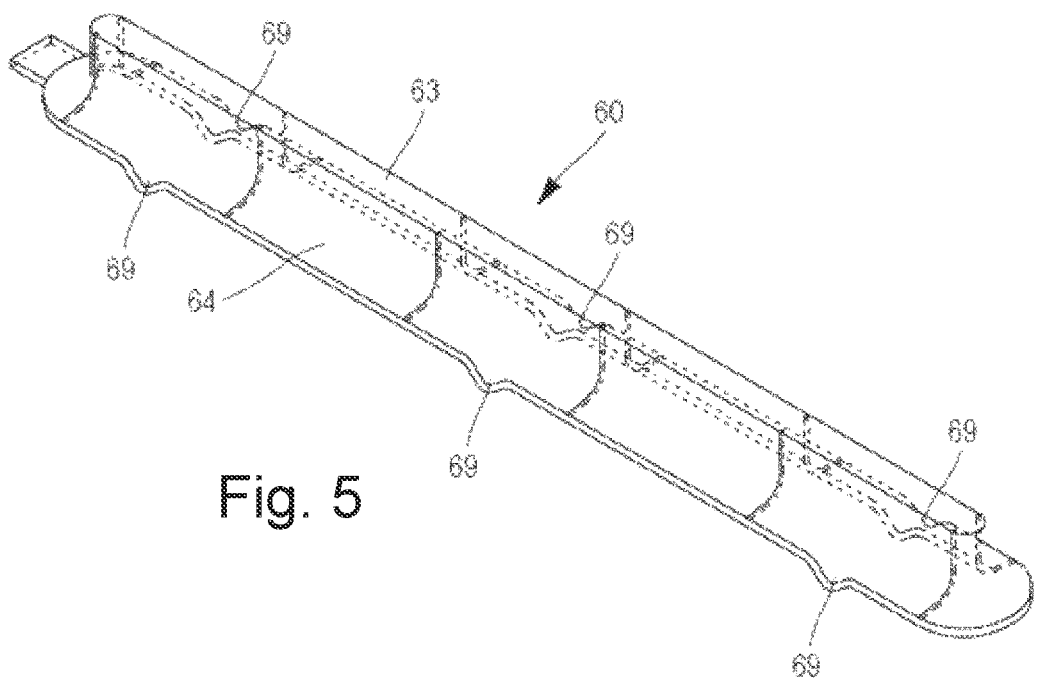
FIG. 5 is a perspective view of a sealing joint according to a second embodiment.

FIG. 5 shows a sealing joint 60 according to an alternative embodiment. This sealing joint 60 is conformed to adapt to a membrane 5 in which the undulations protrude toward the outer side of the tank. Such a membrane is, for example, a secondary membrane 5 in accordance with Mark V technology. Therefore, the peripheral sealing lip 64 comprises protruding zones 69 which are intended to be inserted inside the undulations of the membrane 5.

A procedure for detecting a sealing defect of a weld seam is as follows.

Figure 6:
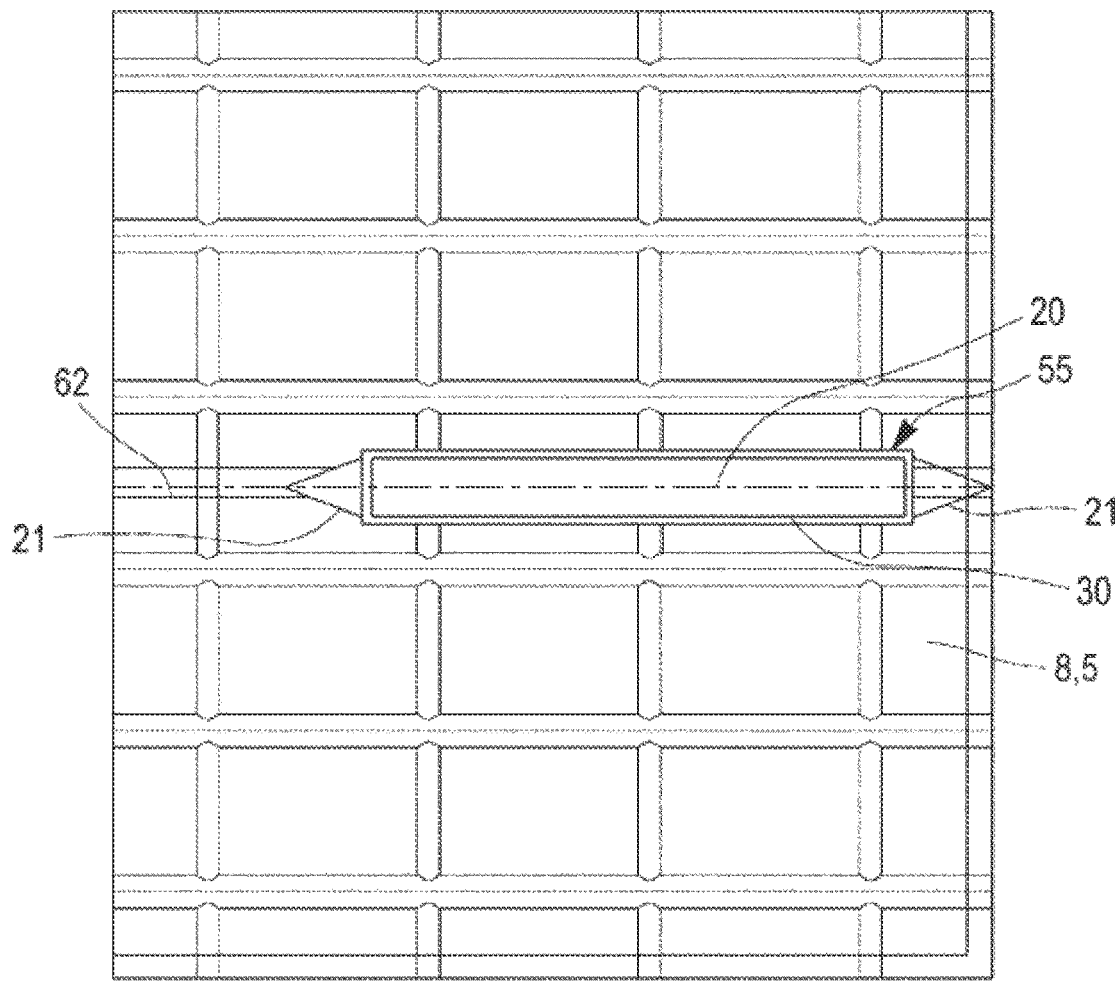
FIG. 6 schematically illustrates the positioning of the detection bell-like member opposite a portion of a weld seam which ensures the sealing between two adjacent undulating metal sheets of a membrane.

Initially, the detection bell-like member 55 is arranged opposite the portion of the weld seam 62 to be tested, which extends a rectilinear edge of a rectangular metal sheet, as illustrated in FIG. 6.

It should be ensured that the detection bell-like member 55 is correctly centered relative to the weld seam 62 so that the two lateral portions of the curved portion of the peripheral sealing lip 64 are arranged at one side and the other of the weld seam 62.

To this end, FIG. 6 also illustrates the sighting device, which is produced in this instance in the form of two indicator points 21 which are placed precisely to be superimposed on the weld seam 62 by the operator to thus align the longitudinal center axis 20 of the detection chamber with the weld seam 62. In the case of the optical sighting device of FIG. 21, the light beams 23 are what will be placed precisely to be superimposed on the weld seam 62.

FIG. 6 also schematically illustrates the contour 30 of the detection chamber 61, that is, the sealed contact line between the peripheral sealing lip 64 and the membrane 5, 8.

The vacuum pump 57 is then operated to reduce the pressure in the detection chamber 61 and to promote the migration of the gas through the defective zones of the weld seam 62.

As soon as the pressure inside the detection chamber 61 passes below a pressure threshold $P_s$, a flow of gas is guided from the detection chamber 61 to the analysis equipment item 56 and a predefined leak rate φ of the gas, for example, tracer gas, is measured for a minimum time period Tm. The leak rate φ is then compared with a threshold φs.

Figure 7:
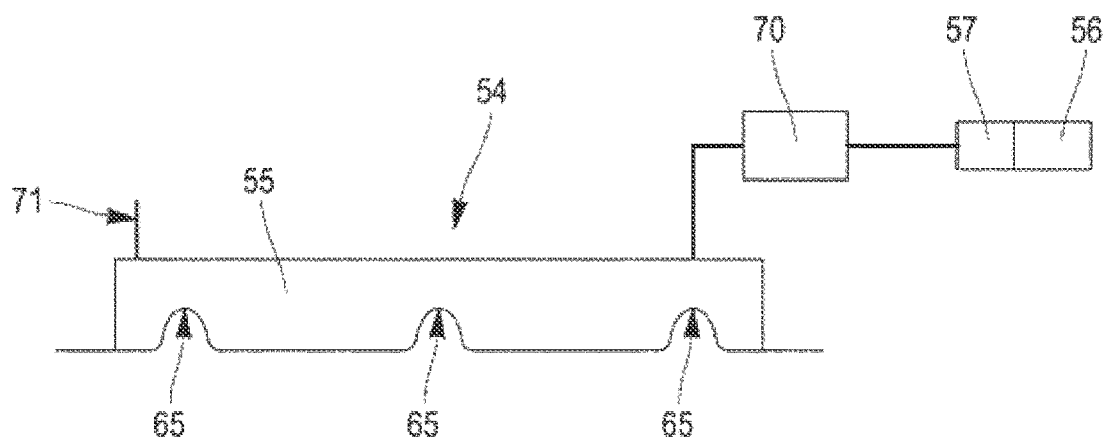
FIG. 7 is a schematic view of a leak detection device according to a second embodiment.

If the leak rate φ is less than the threshold φs, it is concluded that the tested portion of the weld seam 62 does not have a sealing defect. In this instance, the detection bell-like member 55 is then detached from the membrane 5, 8 by releasing the reduced pressure in the detection chamber 61, for example, by opening a gas inlet 71 which is illustrated in FIG. 7. Then, the detection bell-like member 55 is arranged opposite an adjacent portion of the weld seam 62, ensuring an overlap between the two portions which are successively tested to ensure that the sealing of the weld seam 62 has been tested over the entire length of the weld seam 62.

In contrast, if the leak rate φ is greater than or equal to the threshold φs, it is concluded that the tested portion of the weld seam 62 has a sealing defect. Corrective welding measures are thus implemented to correct the defect.

By way of example, for a concentration of helium in the thermally insulating space in the order of 20%, the pressure threshold below which the leak rate is measured is between 10 and 1000 Pa absolute, preferably less than 100 Pa absolute. By way of example, the minimum duration for measuring the leak rate is 5 seconds and the threshold φs is in the order of $1.0 \times 10^{-6}$ $Pa \cdot m^3 \cdot s^{-1}$.

FIG. 7 shows a leak detection device 54 according to another embodiment. This embodiment differs from the embodiment described above in that it further comprises a homogenization chamber 70 which is arranged between the detection chamber 61 and the analysis equipment item 56 and in that the detection bell-like member 55 comprises a gas inlet 71.

The gas inlet 71 is provided with a tap which enables a flow of ambient air toward the detection chamber 61 to be established or interrupted. The homogenization chamber 70 is connected to an end of the detection chamber 61 whilst the gas inlet 71 is connected to the opposite end of the detection chamber 61.

The operating method of the leak detection device 64 is as follows.

When the detection bell-like member 55 is arranged opposite the portion of the weld seam 62 to be tested, the tap of the gas inlet 71 is closed and the vacuum pump 57 is operated to reduce the pressure in the detection chamber 61. As soon as the pressure inside the detection chamber passes below a pressure threshold Ps, the tap of the gas inlet 71 is opened and the gas assembly previously contained in the sealed chamber is transferred to the homogenization chamber 70. The homogenization chamber 70 has a volume greater than that of the detection chamber 61 and comprises, for example, a piston system which enables all the gas contained in the detection chamber 61 to be drawn in in a precise manner.

The gas contained in the homogenization chamber 70 is then transferred in the direction toward the analysis equipment item 56 to determine a gas leak rate cp.

Such an embodiment is advantageous in that it enables the time for the diffusion of the gas inside the detection bell-like member 55 to be reduced and thus enables the minimum measuring time to be reduced. This is particularly advantageous when the time for the gas to migrate from one end to another of the detection bell-like member 55 is likely to be long because of a significant length of the detection bell-like member 55 and/or when the reduced pressure applied inside the detection chamber 61 is inadequate.

Figure 8:
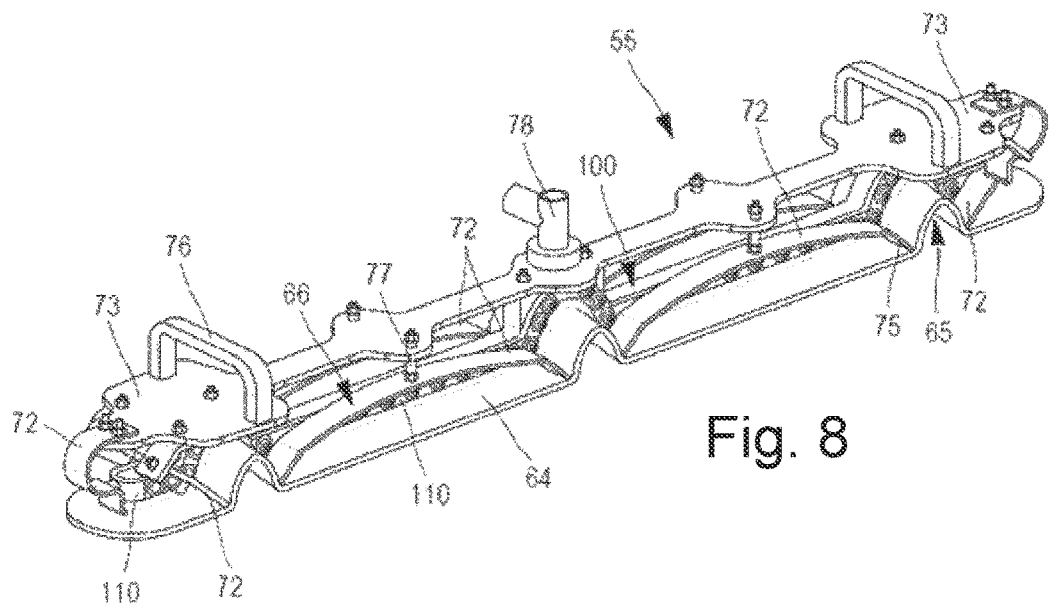
FIG. 8 is a perspective view of a leak detection bell-like member according to a third embodiment.

FIG. 8 shows a detection bell-like member 55 according to a third embodiment. The detection bell-like member 55 of FIG. 8 is configured in a similar manner to the detection bell-like member 55 of FIG. 4 but differs in particular with regard to the mechanical pressure means 66. This is because the detection bell-like member 55 comprises a main body 100 which extends in a longitudinal direction, a flexible sealing joint 60 which is fixed to the main body 100 and a mechanical pressure means 66 which is carried by the main body and which is configured to apply a pressure directed toward the membrane 5, 8 to the sealing joint 60. The main body 100 comprises a rigid core 59. The rigid core 59 comprises a channel 82 which enables a lower surface 80 to be connected to an upper surface 81 of the rigid core 59. The channel 82 enables the detection chamber 61 to be placed in communication with the gas outlet 78.

The sealing joint 60 comprises a casing 63 which is fixed to the rigid core 59 via fixing means 110, for example, comprising a circle which surrounds the entire circumference of the rigid core 59 and the sealing joint 60 and which fixes these two elements 59/60 to each other via a mechanical fixing element, such as screws. The sealing joint 60 also comprises a peripheral sealing lip 64 which is connected to the casing 63 and which has a closed contour which enables the portion of the weld seam 62 to be tested to be surrounded. The peripheral lip 64 is further curved in the opposite direction to the main body 100 to have a portion of the peripheral lip 64 which is substantially parallel with the membrane 5, 8. The peripheral sealing lip 64 also has a plurality of notches 65 which are spaced apart over the circumference thereof, the notches 65 being in the form of undulations of the membrane 5, 8 to be tested. In this manner, when the detection bell-like member 55 is placed on the membrane 5, 8, the notches 55 enable the detection bell-like member 55 to adapt to the undulating shape of the membrane 5, 8. The main body 100 and the carrier element 73 are in particular passed through by a gas outlet 78 which enables the gas to be discharged when the pressure in the detection chamber 61 is reduced.

A support element 73 extends over the entire length of the main body 100 above it and is fixed to the main body 100. Carrying handles 76 are fixed to the two longitudinal ends of the support element 73 to enable the detection bell-like member 55 to be handled by an operator and, where applicable, to enable the mechanical pressure means to be activated by an action of the operator.

The mechanical pressure means 66 is composed of a plurality of pressure elements 72 which are in the form of curved plates 72 which are distributed over the sealing lip 64 and which are fixed to the support element 73 via fixing means 77. The curved plates 72 are resiliently deformable in order, when they are deformed, to apply a resilient restoring force to the sealing lip 64 to press it against the membrane 5, 8. To make the sealing of the detection chamber 61 reliable, it appears advantageous to press the sealing lip 64 in the zones where the risk of detachment is greatest. This is why curved plates 72 are located in particular at the bases of the notches 64 of the sealing lip 64 and at the longitudinal ends of the detection bell-like member 55 on the sealing lip 64.

A plurality of curved plates 72 are fixed at one of their ends to the support element 73, whilst the other end is placed on the sealing lip 64. These plates 72 are in particular placed on the ends of the detection bell-like member 55. Other curved plates 72 are themselves fixed at the center thereof to the support element 73 whilst the two ends thereof are placed on the sealing lip 64 to apply a pressure to two different zones, these plates 72 being in particular placed between two notches 65.

The curved plates have a cylindrical sleeve 75 at each of the ends thereof in contact with the sealing lip 64. The cylindrical sleeve 75 enables in particular a homogeneous abutment against the sealing lip 64 whilst preventing any pinching which could impair the integrity of the sealing lip 64. The cylindrical sleeve 75 extends in a direction orthogonal to the longitudinal direction of the main body 100. The length of a cylindrical sleeve 75 is further substantially equal to the dimension of the portion of the sealing lip 64 which protrudes from the main body 100 in the direction in which the cylindrical sleeve 75 extends. In this manner, the cylindrical sleeve 75 enables the mechanical pressure means 66 to effectively apply a pressure to the sealing lip.

When the leak detection bell-like member 55 is placed on the zone to be tested, it should be ensured that the mechanical pressure means 66 presses the sealing joint 60 correctly in a sealing manner to be able to test the sealing of the weld seam in an appropriate manner. A problem is therefore ensuring that the mechanical pressure means 66 correctly performs its function all the way around the peripheral sealing lip 64. The zone to be tested and in particular at the ends of the detection bell-like member 55 may be a connection zone between several undulating metal sheets, for example, four undulating metal sheets, so that the zone is not completely planar but comprises level adjustments which make it difficult to press the sealing joint 60.

Figure 13:
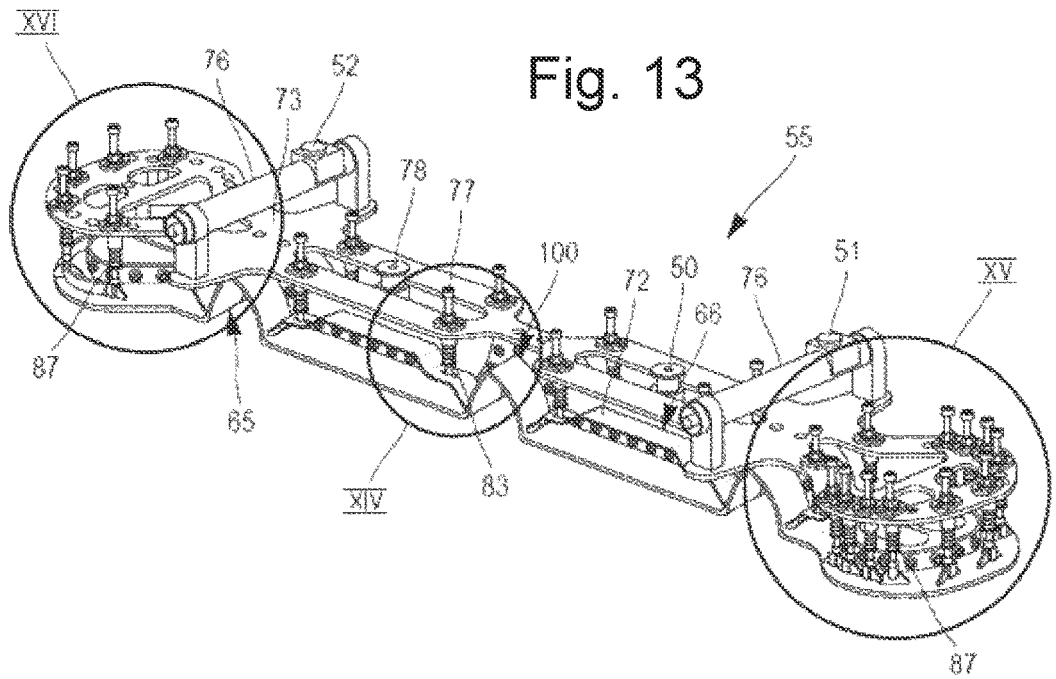
FIG. 13 is a perspective view of a leak detection bell-like member according to a fourth embodiment.

FIG. 13 illustrates a detection bell-like member 55 according to a fourth embodiment in which the mechanical pressure means 66 has been reinforced at the ends of the detection bell-like member 55 to overcome the non-planar nature of the zone. The detection bell-like member 55 of FIG. 13 is configured in a similar manner to the detection bell-like member 55 of FIG. 8 but differs in particular because of the form of the detection chamber which has two circular zones at the two longitudinal ends which are wider than a central rectilinear strip. Other differences relate to the mechanical pressure means 66. This is because the detection bell-like member 55 of FIG. 13 also comprises a main body 100 which extends in a longitudinal direction, a flexible sealing joint 60 which is fixed to the main body 100 and a mechanical pressure means 66 which is carried by the main body and which is configured to apply a pressure which is directed toward the membrane 5, 8 on the sealing joint 60. However, the mechanical pressure means 66 comprises in this instance pressure elements 72 and end pressure elements 87.

Figure 14:
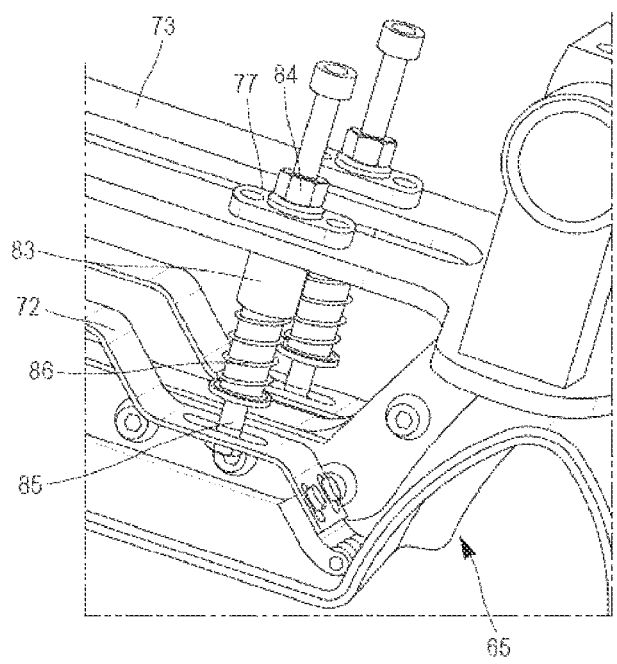
FIG. 14 is an enlarged view of the detail XIV of FIG. 13 illustrating a pressure element of the leak detection bell-like member.

The pressure elements 72 each comprise a curved plate 72, at least one end of which is in abutment with the base of a notch 62. The curved plates 72 located between two contiguous notches themselves comprise one of their ends which is located against the base of one of the notches 65 and the other of the ends which is located against the base of the other of the notches 65. The pressure elements 72 are in this instance, as illustrated in FIG. 14, fixed by fixing means 77 each comprising a pin 83. The pins 83 each comprise a rod 85 which is movably mounted on a body 84. The rod 85 comprise one end in abutment against one of the curved plates 72. The body 84 is fixed to the support element 73. The pin 83 also comprises a spring 86 which connects the rod 85 to the body 84, the spring 86 acting between the body 84 and the rod 85 to position the end of the rod 85 in abutment against the curved plate 72. In this manner, the spring 86 is configured to apply a restoring force to the curved plate 72 so that the curved plate 72 presses the sealing lip 64 against the base of the undulation.

The end pressure elements 87 are located at the two ends of the sealing lip 64 in a longitudinal direction, that is, at the two ends of the leak detection bell-like member 55 given that it has a generally longitudinal shape. The end pressure elements 87 may be configured in accordance with a plurality of separate variants which may or may not be combined on the same leak detection bell-like member 55. For the sake of brevity, three variants of the end pressure elements 87 are illustrated in FIG. 13 in the same leak detection bell-like member 55.

Figure 15:
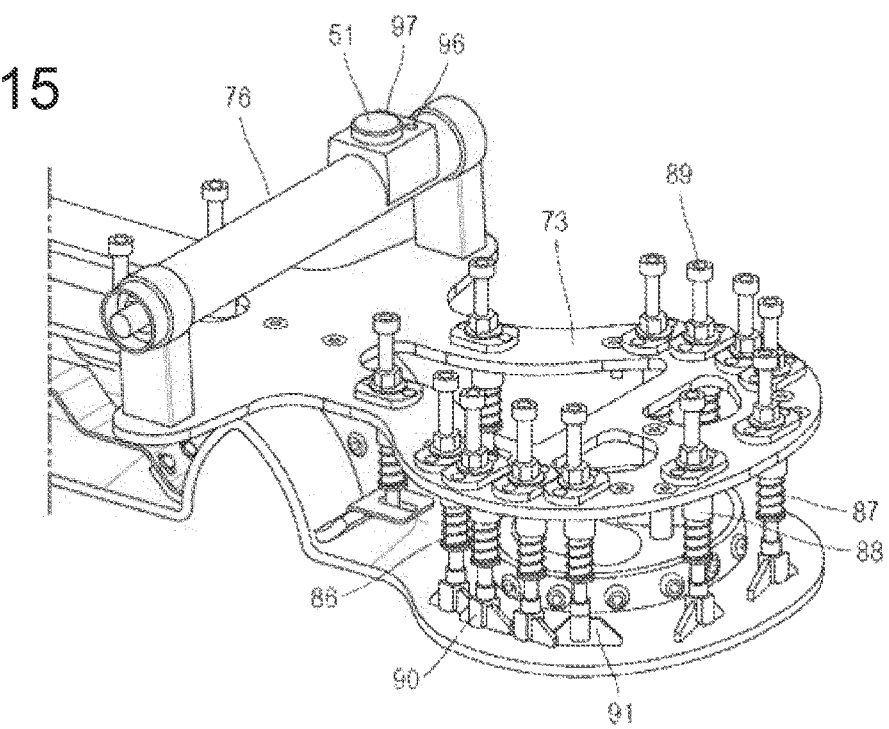
FIG. 15 is an enlarged view of the detail XV of FIG. 13 illustrating a first end of the leak detection bell-like member.
Figure 16:
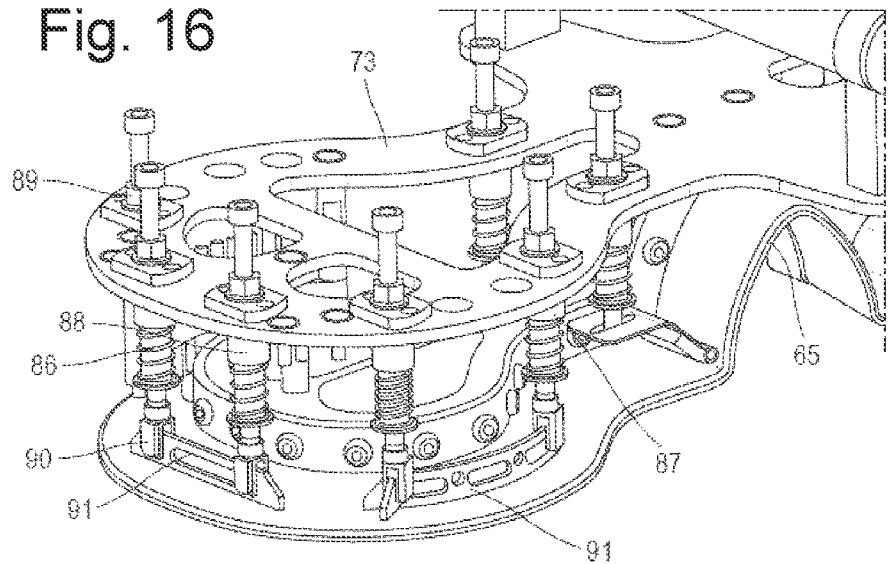
FIG. 16 is an enlarged view of the detail XVI of FIG. 13 illustrating a second end of the leak detection bell-like member.
Figures 17, 18:
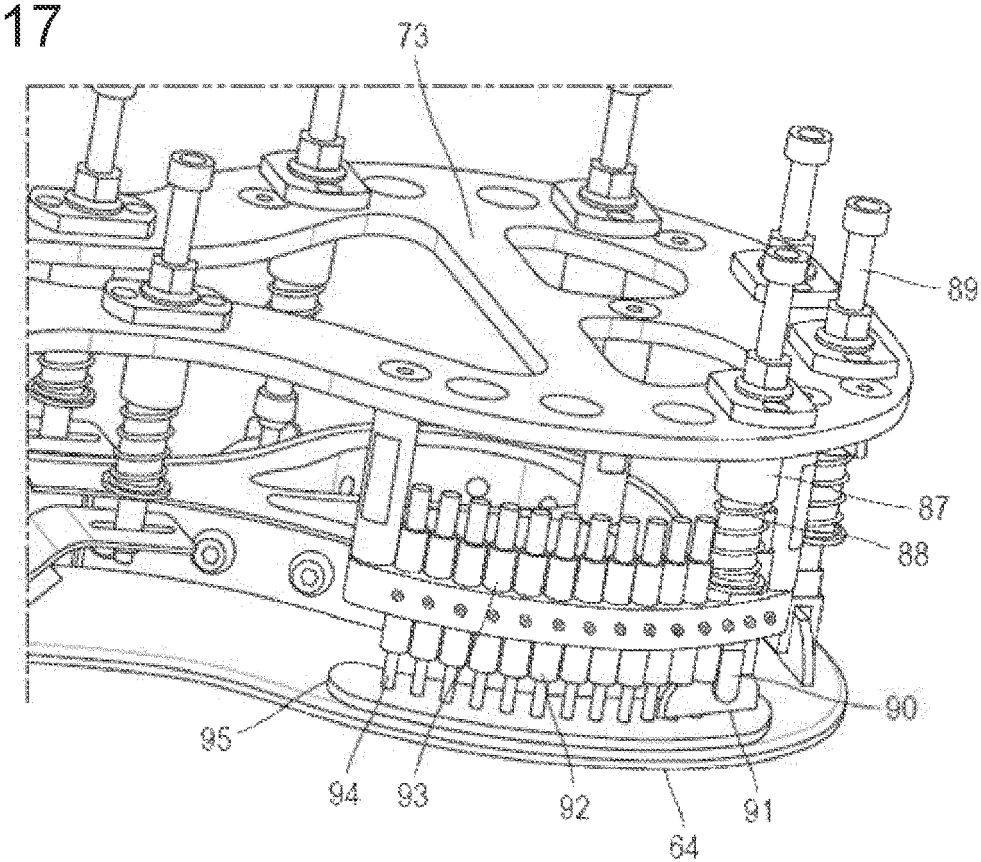
FIG. 17 is an enlarged view of the detail XVI of FIG. 13 from another viewing angle.
FIG. 18 is a plan view of a sealing membrane illustrating schematically a detection bell-like member which is positioned to test a connection between four rectangular metal sheets.

FIGS. 15 to 17 illustrate the three variants of the end pressure elements 87. As illustrated in FIG. 15, according to the first variant, the end pressure element 87 comprises an end pin 88. The end pins 88 each comprise a rod 90 which is mounted to be movable on a body 89. An elongate abutment element 91 is fixed to one end of the rod 90, the elongate abutment element 91 being in abutment against the sealing lip 64. The body 89 is fixed to the support element 73. The end pin 88 also comprises a spring 86 which connects the rod 90 to the body 89, the spring 86 acting between the body 89 and the rod 90 to position the elongate abutment element 91 against the sealing lip 64. In this manner, the spring 86 is configured to apply a restoring force to the elongate abutment element 91 so that the elongate abutment element 91 presses the sealing lip 64 against the zone to be tested. In this manner, the restoring force is applied to the sealing lip 64 over the entire length of the elongate abutment element 91. In the case of the first variant of FIG. 15, each elongate abutment element 91 is fixed to only one rod 90 of an end pin 88.

A second variant of the end pressure elements 87 is illustrated in FIG. 16. The second variant differs from the first variant because of the elongate abutment element 91 of the end pins 88, the other features of the end pressure elements 87 are retained. In this variant, the elongate abutment element 91 is fixed to an end of a rod 90 of a first end pin 88 and to an end of a rod 90 of a second end pin 88 adjacent to the first end pin 88. The elongate abutment element 91 is therefore in this instance longer than in the first variant and is thus pressed by two end pins 88 which are distributed over the length thereof to form an abutment with a greater length on the sealing lip 64.

A third variant of the end pressure elements 87 is illustrated in FIG. 17. In this variant, the end pressure element 87 comprises a plurality of adjustment elements 92 which form a row of elements. The adjustment element 92 comprises a rod 93 which extends in the direction of the sealing lip 64 and perpendicularly to the zone to be tested and an end 94 whose position can be adjusted in a longitudinal direction of the rod to come into contact with the sealing lip 64 after the rod 93 has been adjusted. In this manner, it is possible to more finely adjust the end pressure element 87 using the adjustment elements 92 to conform more precisely to the zone to be tested and therefore to improve the sealing of the detection chamber 61.

FIG. 17 also illustrates a distribution base 95 which may be arranged between the ends 94 of the rods 93 and the upper surface of the sealing lip 64 to limit the risk of pinching of the sealing lip 64 and thus to increase the durability thereof. The distribution base 95 may be an elongate plate which is generally rectilinear or, as illustrated, arced to follow the contour of the sealing lip 64. The material thereof may be a rigid plastics resin. Preferably, connection sleeves are formed to protrude on the upper surface of the distribution base 95 to receive the ends 94 and thus to fix the distribution base 95 relative to the rods 93.

There will be described below a method of using of a leak detection bell-like member 65, as illustrated in FIG. 8 in a leak detection device 54 comprising the bell-like member 65, a vacuum pump 57 which is connected to the detection chamber 61 via the gas outlet 78 and an analysis equipment item 56. The use of such a detection device 54 enables the sealing of a weld seam 62 between two undulating metal sheets of a sealing membrane 5, 8 to be verified.

Figure 9:
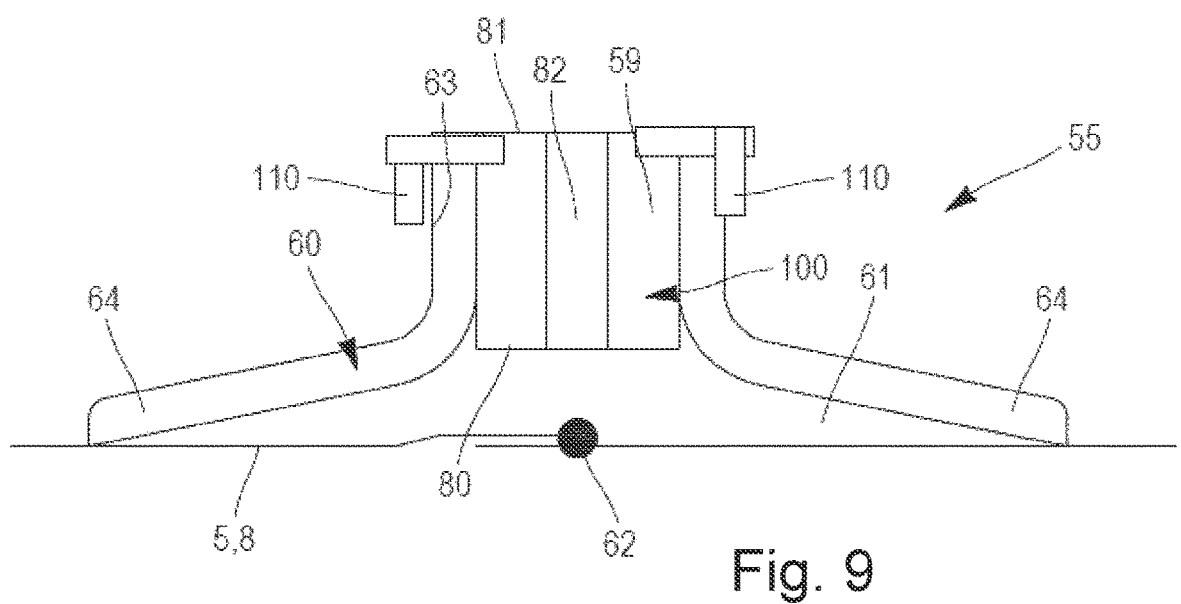
FIG. 9 is a schematic cross section of the detection bell-like member of FIG. 8 before the pressure is reduced in the detection chamber.

First, the detection bell-like member 55 is placed in the zone for which the sealing is intended to be tested, in this instance a portion of the weld seam 62, for example, via one or more operators via the carrying handles 76. To this end, the main body 100 of the detection bell-like member 55 is placed above the weld seam 62 so that the length of the main body 100 is aligned with and centered on the weld seam 62. If necessary, a sighting device described above can be used for this purpose. In this manner, the sealing lip 64 is located at one side and the other of the weld seam 62 and completely surrounds the zone of the weld seam 62 to be tested to form with the main body 100 and the membrane 5, 8 a sealed detection chamber 61, as can be seen in FIG. 9.

After the detection bell-like member 55 has been placed on the weld seam 62, the detection bell-like member 55 is fixed in the manner of a suction cup to the membrane 5, 8 because of the reduced pressure force activated by the vacuum pump 57. This reduced pressure force activates, if necessary, the mechanical pressure means 66 so that it redirects the pressure to press the sealing lip 64 on the membrane 5, 8 in specific well-defined zones.

When the mechanical pressure means 66 is subjected to a force on the support element 73, the support element 73 retransmits the force to the curved plates 72 via their respective fixings which tends to resiliently deform the curved plates 72. As a result, thereof and by means of resilient return, the curved plates 72 transmit the force to the sealing lip 64 via the cylindrical sleeves 75 at the zones in which the detachment of the sealing lip is most likely, that is to say, the longitudinal ends of the main body 100 and the bases of the notches 65.

Figure 10:
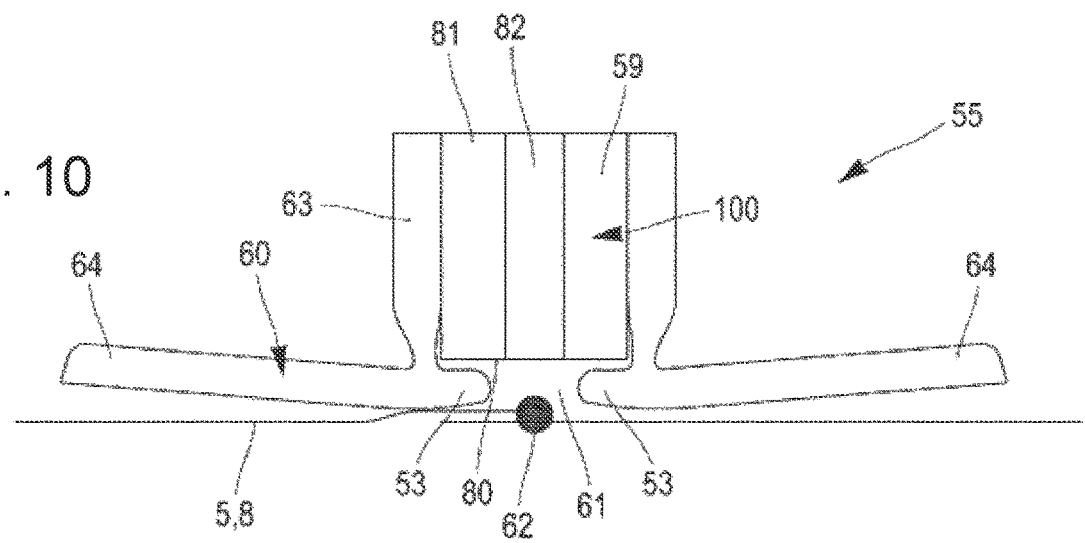
FIG. 10 is a schematic cross section of the detection bell-like member of FIG. 8 after the pressure in the detection chamber has been reduced.

The vacuum pump 57 generates a reduced pressure in the detection chamber 61 via the channel 82 and the gas outlet 78. The flexibility of the sealing lip 64 brings about a deformation thereof when the pressure in the detection chamber 61 is reduced, which tends to reduce the volume of the detection chamber 61. This is because the sealing lip 64 thus moves together at one side and the other of the weld seam 62, as can be seen in FIG. 10. As soon as the pressure inside the detection chamber 61 falls below a pressure threshold Ps, the gases present in the detection chamber 61 are guided to the analysis equipment item 56.

The analysis equipment item 56 thus analyses during a measurement period Tm the gas concentration of the gases present in the detection chamber 61 to obtain a value which is representative of the development of the concentration. This representative value is then compared with a threshold value to determine if the portion of the weld seam 62 tested has a sealing defect or not.

If the value measured is less than the threshold value, it is concluded that the tested portion does not have any sealing defect and, in this case, the detection bell-like member 55 is then arranged facing an adjacent portion of the weld seam 62 while ensuring an overlap between the two portions which are successively tested so as to ensure that the sealing of the weld seam 62 has been tested over the entire length of the weld seam 62.

If the value measured is greater than or equal to the threshold value, it is concluded that the tested portion of the weld seam 62 has a sealing defect. Corrective welding measures are therefore implemented to correct the defect. Measures using a complementary detection tool can also be envisaged to locate more precisely the location of the sealing defect.

In this manner, the sealing lip 64 advantageously occupies two positions depending on its initial state, either without the application of a reduced pressure in the detection chamber 61 or in the operating state thereof when such a reduced pressure is applied.

In the initial state thereof, the sealing lip 64 rests with no pressure on the surface of a sealing membrane 5, 8, whilst, in the operating state thereof, at least one pinch portion 53 located at an inner end of the sealing lip 64 is pressed below the main body 100 to completely seal the contour or the periphery of the detection chamber 61. This is because, because of the flexibility of the sealing lip 64, it is pinched between the main body 100 and the membrane 5, 8 when the reduced pressure is applied. This positioning of the pinch portion 53 of the sealing lip 64 between the main body 100, in a state crushed or compressed thereby, and the sealing membrane 5, 8 effectively contributes to obtaining complete sealing of the detection chamber 61, thus enabling a pressure reduction of a maximum of 1500 Pa (15 mbar) or even having a much lower pressure to be obtained and maintained.

In this manner, according to a preferred embodiment, the sealing lip 64 has an operating state, when a reduced pressure is applied in the detection chamber 61, in which a pinching portion 53 of the sealing lip 64 is held between the main body 100 and the sealing membrane 5, 8 over at least a portion of the periphery of the detection chamber 61, or over the entire periphery of the chamber 61. As a result of this pinching, it is possible to dispense with all or part of the mechanical pressure means described above.

In a construction variant, the peripheral sealing lip 64 is formed with the pinching portion 53 which protrudes permanently below the main body 100, that is, also in the initial state without reduced pressure, for example, all the way around the detection chamber 61 or over a portion of the periphery thereof.

As indicated above, the zone to be tested may be a connection zone between several metal sheets, for example, four rectangular metal sheets, which may or may not be undulating. Such a use of the detection bell-like member 55 will now be described with reference to FIGS. 18 to 20.

With regard to a connection zone between several planar rectangular metal sheets, it is possible, for example, to refer to the publication EP-A-0064886. The publication U.S. Pat. No. 4,021,982 illustrates in FIG. 24 a connection zone between several undulating rectangular metal sheets. In these examples, as in that of FIG. 18, each of the four rectangular metal sheets 31 comprises a cut face 32 at the corner, for example, forming an angle of 45° with the edges of the metal sheet. The four cut faces 32 are moved closer to each other with overlapping on a metal insert 33 which is fixed to the insulating mass and of which a central zone, which is in this instance square, remains exposed between the four cut faces 32. This central zone of the metal insert 33 forms a portion of the sealing membrane because of the sealed weld lines produced along the cut faces 32.

The broken lines 34 represent offset curves in the thickness direction of the rectangular metal sheets 31 which enable the occurrences of mutual overlapping, in accordance with the known technique.

In FIG. 18, the detection bell-like member has a shape which corresponds to the embodiment of FIG. 13. The position of the detection bell-like member has been outlined, representing the contour of the sealing lip 64 and the contour 30 of the detection chamber 61 which is partially illustrated. In particular, the circular zone 25 of the detection chamber 61 is positioned in line with the above-mentioned connection zone, for example, centered on the exposed portion of the metal insert 33, whilst the central rectilinear strip 24 of the detection chamber 61 is positioned on a rectilinear edge of one of the rectangular metal sheets 31. The circular zone 25 of the detection chamber 61 has a diameter which is adapted to completely surround the four cut faces 32 in line with the above-mentioned connection zone. To this end, the diameter thereof is, for example, greater than 68 mm for an undulating membrane of the Mark III® type.

In FIG. 18, the end pressure elements 87 have been outlined using dashed lines. It can thus be noted that the end pressure elements 87 have been positioned on the detection bell-like member so that, when the detection bell-like member is positioned at this location, the end pressure elements 87 are in fact located in line with the weld seams 62 which join the rectangular metal sheets 31 together along the edges. In this manner, the end pressure elements 87 press on the portions of the peripheral sealing lip 64 which rest on these weld seams 62, which necessarily have a degree of relief. The end pressure elements 87 positioned in this manner make it possible to obtain a completely sealed contact despite this relief. In particular, it can be seen in FIG. 18 that three end pressure elements 87 press on three portions of the peripheral sealing lip 64 which extend over three weld seams 62 of this connection zone, respectively.

The end pressure elements 87 illustrated in FIG. 18 preferably have an elongate rectangular or curvilinear form. They may in particular be produced in the form of elongate abutment elements 91, as in FIG. 16, or with a distribution base 95, as in FIG. 17.

Figure 26:
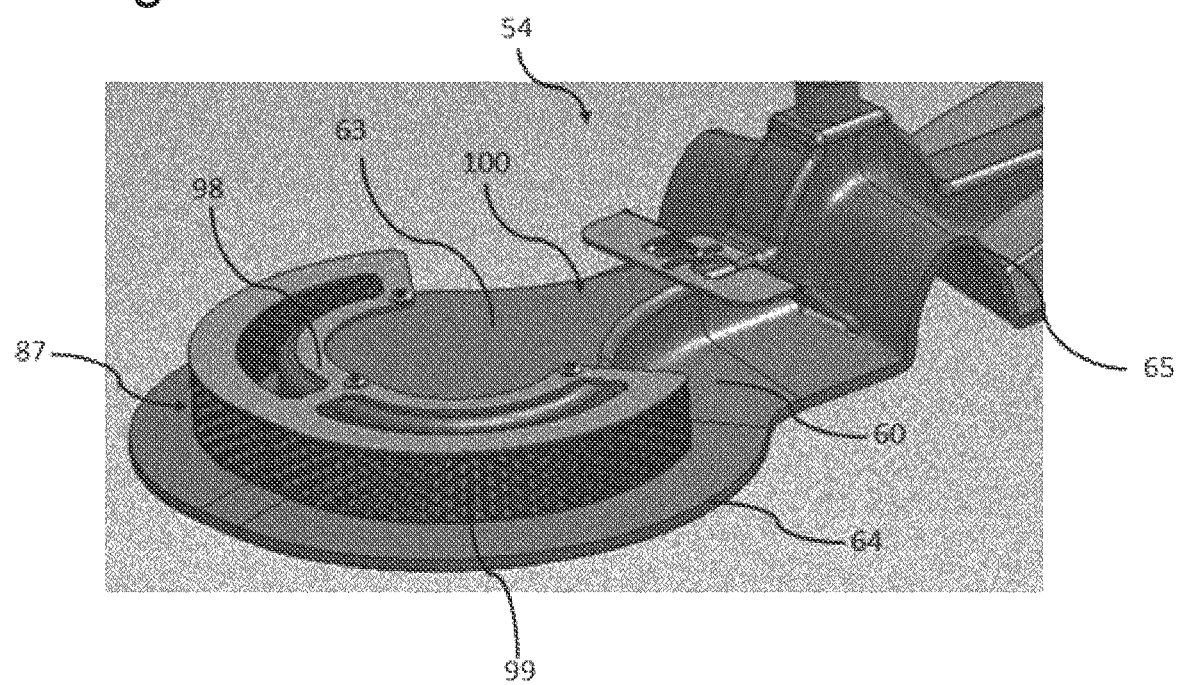
FIG. 26 is a perspective view of an end of the leak detection device which comprises an end pressure element according to another construction variant.

FIG. 26 illustrates another construction variant of the end pressure elements 87. In this variant, the end pressure element 87 is formed by a honeycomb 99 which is fixed to the end of the detection bell-like member, and which extends all the way around the rounded portion of the main body 100. The honeycomb 99 has a lower face which is in abutment against the sealing lip 64 and an upper face which has a fixing portion 98 which is fixed directly to the main body 10 via the casing 63. The honeycomb 99 has the advantage of being a light structure and, because of the fact that it is directly fixed to the main body 100, it is possible to dispense with the support element 73 to further lighten the structure of the detection bell-like member. Furthermore, the honeycomb 99 has in this instance a function of a spring element. This is because, when the operator presses on the carrying handles, the honeycomb 99 is resiliently deformed and applies a homogeneous resilient restoring force to the entire lower surface thereof which is in contact with the sealing lip 64 to ensure a pressing of this sealing lip 64 against the zone to be tested.

Figure 19:
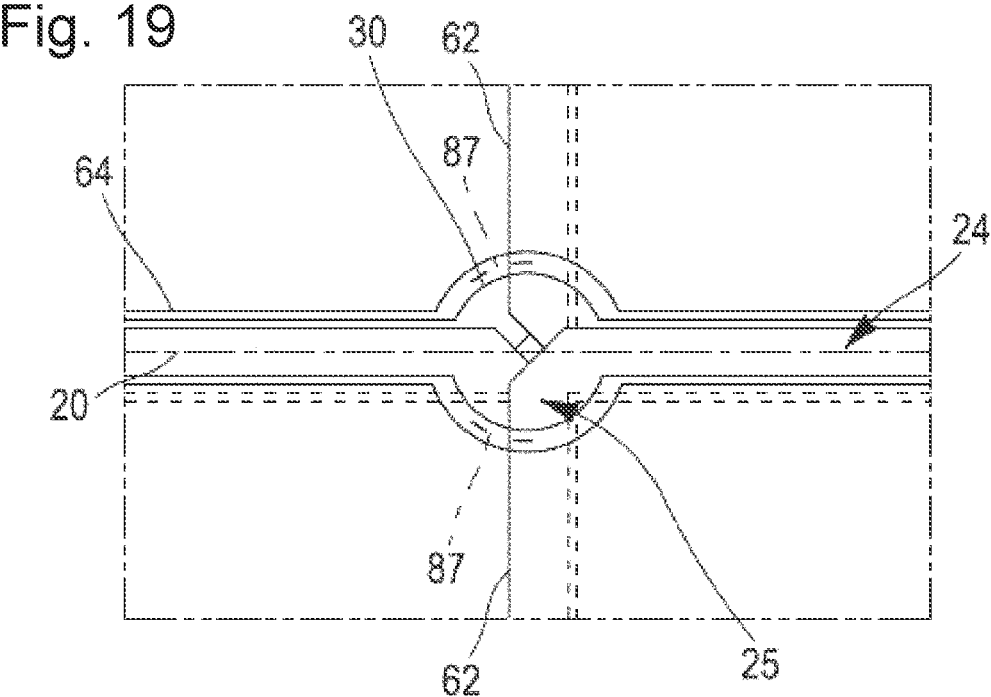
FIG. 19 is a view similar to FIG. 18, illustrating a different geometry of the detection bell-like member which is positioned to test a connection between four rectangular metal sheets.
Figure 20:
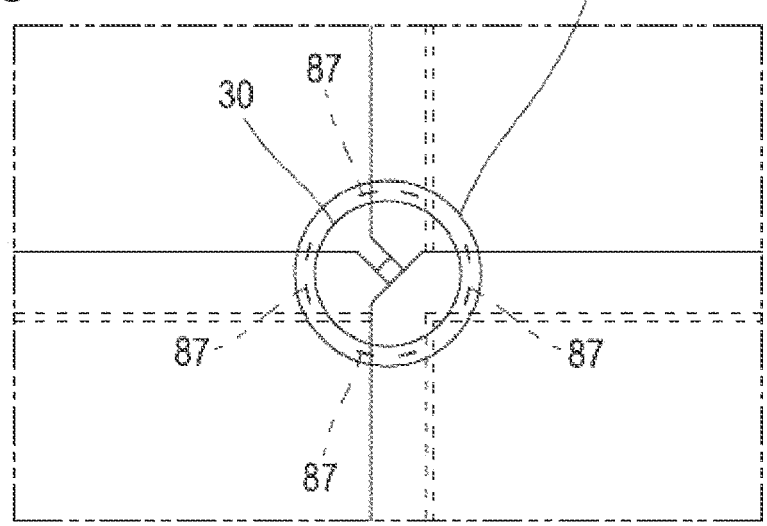
FIG. 20 is a view similar to FIG. 18, again illustrating a different geometry of the detection bell-like member which is positioned to test a connection between four rectangular metal sheets.

Other geometries of the detection bell-like member may be envisaged for this use. In the embodiment of FIG. 19, the detection bell-like member has a modified form in which the circular zone 25 constitutes a central portion of the detection chamber 61 and the detection chamber 61 has two elongate zones 24 which extend from the circular zone 25 in a mutually diametrically opposed manner along the longitudinal center axis 20. In the embodiment of FIG. 20, the detection bell-like member has a modified form in which the detection chamber 61 has a circular shape.

FIG. 19 shows that two end pressure elements 87 press on two portions of the peripheral sealing lip 64 which extends across two weld seams 62 of this connection zone, respectively, at locations which are diametrically opposed around the circular zone 25. FIG. 20 shows that four end pressure elements 87 press on four portions of the peripheral sealing lip 64 which extends across four weld seams 62 of this connection zone, respectively.

In a variant, a convex polygonal shape may be used in place of the circular zone 25, in which case a circle geometrically inscribed in the shape of the detection chamber must have a diameter which is adapted to completely surround the four cut faces 32 in line with the above-mentioned connection zone.

With reference to FIGS. 22 to 25, an embodiment of the leak detection device 54 will now be described in which the detection bell-like member 55 according to the fourth embodiment can be used.

The leak detection device 54 comprises the detection bell-like member 55, the analysis equipment item 56 with the associated vacuum pump 57 thereof, where applicable a second vacuum pump 37 with greater power, and a suction circuit which connects the detection chamber 61 to the analysis equipment item 56 via a solenoid valve 48. The suction circuit preferably comprises a flexible pipe 58 of quite great length to promote the mobility of the detection bell-like member 55 on a relatively extensive working zone around the analysis equipment item 56. This flexible pipe 58 is, for example, connected via connectors 39, on the one hand, to an output of the detection chamber 61 and, on the other hand, to the analysis equipment item 56. When a second vacuum pump 37 is used, a branch connection 38 may be provided to connect the analysis equipment item 56 and the second vacuum pump 37 as a branch with respect to each other.

A control unit 36 is also provided to control the solenoid valve 48, and where applicable other elements such as the analysis equipment item 56, in response to actions of an operator on one or more control members of the detection bell-like member 55 which are, for example, arranged on one or more carrying handles 76 of the detection bell-like member 55.

For example, in the case of the detection bell-like member 55 according to the fourth embodiment, the two carrying handles 76 are each provided with a push-button which can be activated with the thumb, and which is configured as an activation button 51 and a deactivation button 52, respectively. Control members which have a form other than a push-button can be envisaged alternatively, for example, a capacitive touch button, a tilting lever, or any other member which can be manually activated.

In a preferred embodiment, the vacuum pump 37 or other source of reduced pressure is activated beforehand and permanently generates a reduced pressure in the suction circuit. The solenoid valve 48 has a closed state by default so that the detection chamber 61 is not initially subjected to the reduced pressure, which enables the detection bell-like member 55 to be moved freely on the membrane 5, 8.

Figure 23:
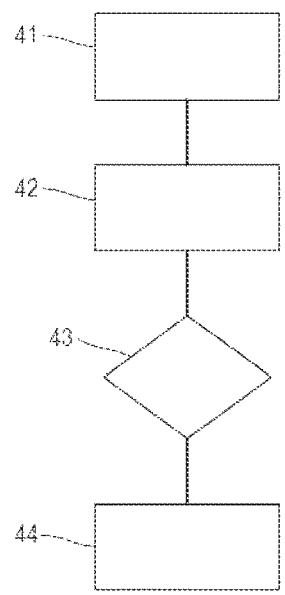
FIG. 23 is a chart illustrating an activation method which can be used in the leak detection device of FIG. 22.
Figure 24:
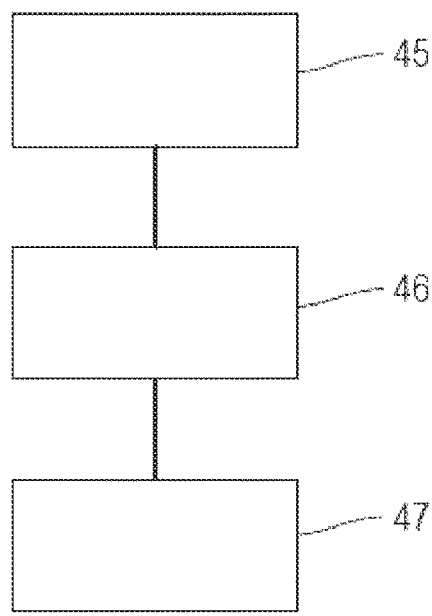
FIG. 24 is a chart illustrating a deactivation method which can be used in the leak detection device of FIG. 22.

Starting from this state, the control methods illustrated in FIGS. 23 and 24 can be implemented by the control unit 36:

In step 41, an activation control signal transmitted by the activation button 51 is detected.

In step 42, the solenoid valve 48 is switched into an open state to connect the detection chamber 61 to the vacuum pump 37. This state may be signaled by the illumination of an indicator light on the detection bell-like member 55, for example, a red LED, for example, on the carrying handle, as indicated by the reference numeral 96 in FIG. 15.

A suction into the detection chamber 61 is then produced. If the detection bell-like member 55 is correctly positioned on the membrane with the sealing lip 24 in sealing contact with the membrane 5, 8 all around the detection chamber 61, the reduced pressure is established and presses the detection bell-like member 55 firmly against the membrane 5, 8, with the sealing lip 24 being crushed. The analysis of the gas originating from the detection chamber 61 may then be carried out as explained above.

In step 45, a deactivation control signal transmitted by the deactivation button 52 is detected.

In step 46, the solenoid valve 48 is switched into a closed state to isolate the detection chamber 61 from the vacuum pump 37. The reduced pressure in the detection chamber 61 is no longer maintained, which enables the pressure to rise. However, unless there is a significant leak rate, this pressure rise may be very slow.

Preferably, in step 47, a vent is therefore opened to place the detection chamber 61 in communication with the ambient atmosphere, which enables the detection bell-like member 55 to be released immediately from the membrane 5, 8.

Figure 22:
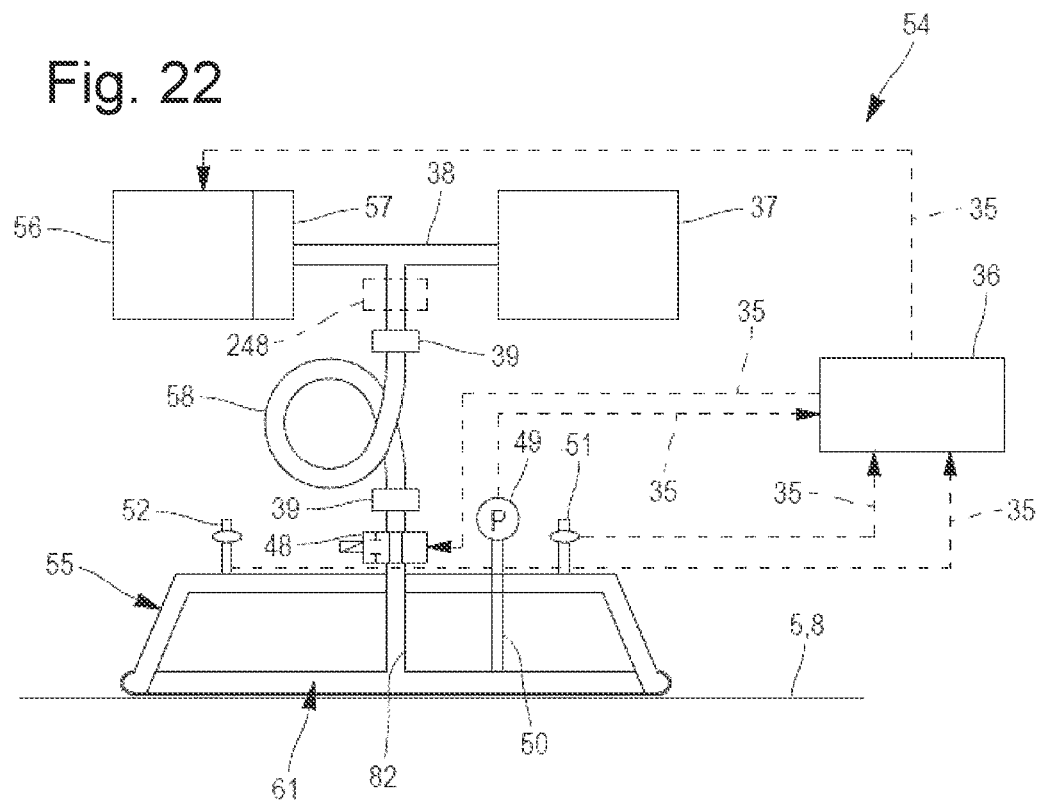
FIG. 22 is a functional schematic view of a leak detection device using the leak detection bell-like member of FIG. 13.
Figure 25:
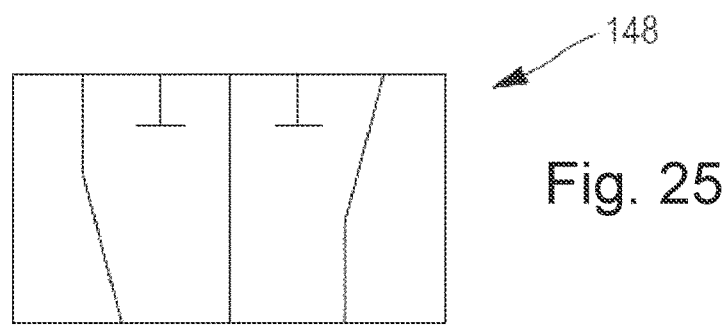
FIG. 25 is a functional schematic view of a three-way valve which can be used in the leak detection device of FIG. 22.

In an embodiment, the steps 46 and 47 are carried out simultaneously by switching a three-way valve 148 which is schematically illustrated in FIG. 25, and which is used in place of the solenoid valve 48 of FIG. 22.

The solenoid valve 48 may be positioned on the gas outlet 78 of the detection bell-like member 55, as illustrated in FIG. 22. It may also be positioned at another location in the suction circuit, for example, in the region of the branch connection 38, as illustrated by the reference numeral 248.

The control signals between the control unit 36, the solenoid valve 48 and the activation button 51 and the deactivation button 52 are transported by wired or wireless communication connections 35, for example, produced in the form of a flexible electrical cable or a braid of flexible cables to promote the mobility of the detection bell-like member 55.

In an embodiment, the control unit 36 is configured to also control the analysis equipment item 56. To this end, a wired or wireless communication connection 35 is also provided between the control unit 36 and the analysis equipment item 56. Furthermore, a pressure sensor 49 which is also connected to the control unit 36 is provided on the detection bell-like member 55 to measure the pressure in the detection chamber 61 following the step 42.

In this instance, the control method carried out following the activation control signal continues in the following manner:

In step 43, the pressure indicated by the measurement signal of the pressure sensor 49 is compared with a pressure threshold which is predefined to enable the operation of the analysis equipment item 56. If the pressure measured is lower than this threshold, the step 44 is carried out. This state may be signaled by the illumination of another indicator light on the detection bell-like member 55, for example, a green LED, for example, on the carrying handle 76, as indicated with the reference numeral 97 of FIG. 15.

In step 44, the analysis equipment item 56 is activated to carry out an analysis cycle which enables a leak rate to be detected, as explained above.

In the case of the detection bell-like member according to the fourth embodiment illustrated in FIG. 13 or 21, two channels 82 and 50 extend through the main body to connect the detection chamber 61 to two gas outlets 78 and 50. The pressure sensor 49 may be placed on the detection bell-like member 55 and connected to the gas outlet 50, as illustrated in FIG. 22. The pressure sensor 49 could also be arranged at another position.

As a result of the control methods described above, and in particular with the detection bell-like member according to the fourth embodiment, the use of the leak detection device 54 is particularly easy and rapid.

The reduced pressure source having been previously activated, the operator grips the detection bell-like member 55 by the two handles and positions the detection bell-like member 55 in the selected test zone, if necessary, using sighting devices described above.

Then, the operator presses the activation button 51. The method of FIG. 23 is carried out until a measurement representative of the leak rate by the analysis equipment item 56 is obtained.

The operator only has to press the deactivation button 52 to position the detection bell-like member 55 in another test zone. The detection bell-like member 55 can therefore be used without the operator needing to interact with the vacuum pump 37, the control unit 36 or the analysis equipment item 56, in an entire working zone defined by the length of the fluid and electrical connections of the detection bell-like member 55 with these elements. To promote the mobility of the leak detection device 54 on a larger scale, the vacuum pump 37, the control unit 36 and the analysis equipment item 56 can be mounted on a travelling carriage which is not illustrated.

In another embodiment which is not illustrated, the various features of the preceding embodiments can be combined. This is because, for example, the mechanical pressure means 66 of FIG. 8 can be adapted to a sealing joint 60 of FIG. 5 by modifying the arrangement of the curved plates 72.

The detection bell-like member, the detection device, and the method of using the device described above are more specifically intended to test the sealing of a membrane of a sealed and thermally insulating tank with membranes. By way of example, such membrane tanks are in particular described in the patent applications WO14057221, FR2691520.

Figure 11:
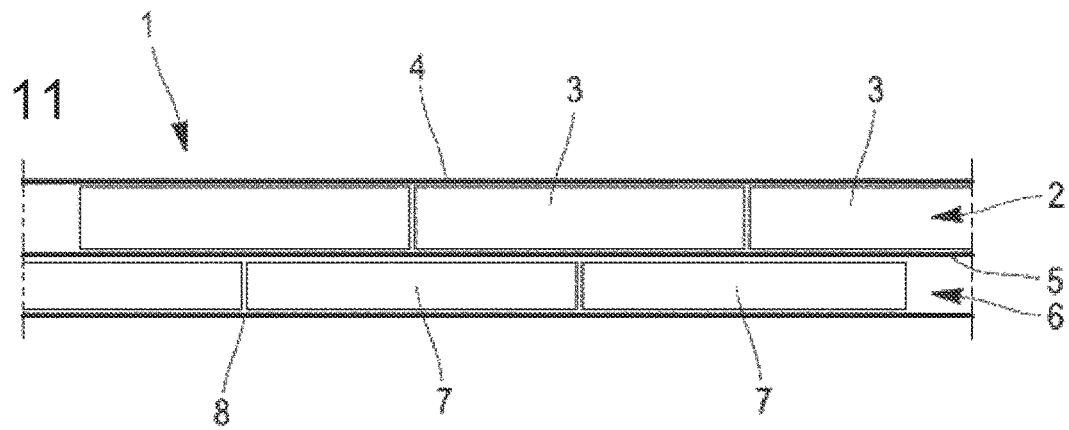
FIG. 11 is a schematic illustration of a multi-layer structure of a wall of a tank with membranes.

Membrane type tanks have a plurality of walls which have a multi-layer structure, as illustrated in FIG. 11. Each wall 1 comprises, from the outer side to the inner side of the tank, a secondary thermally insulating barrier 2 which comprises secondary insulating panels 3 which are anchored to a carrier structure 4, a secondary membrane 5 which rests against the secondary thermally insulating barrier 2, a primary thermally insulating barrier 6 which comprises primary insulating panels 7 which rest against the secondary membrane 2 and which are anchored to the carrier structure 4 or to secondary insulating panels 3 and a primary membrane 8 which rests against the primary thermally insulating barrier 6 and which is intended to be in contact with the liquefied gas contained in the tank.

The tank has a generally polyhedral shape. In the embodiment illustrated in FIG. 12, the tank has a front wall 9 and a rear wall (which is not illustrated) which are in this instance octagonal. The tank also comprises a ceiling wall 10, a base wall 11 and lateral walls 11, 12, 13, 14, 15, 16, 17 which extend in the longitudinal direction of the tank between the front wall 9 and the rear wall.

The secondary thermally insulating barriers 2 of the tank walls communicate with each other to form, between the carrier structure 4 and the secondary membrane 5, a sealed secondary thermally insulating space. In the same manner, the primary thermally insulating barriers of the tank walls communicate with each other to form, between the secondary membrane 5 and the primary membrane 8, a sealed primary thermally insulating space.

At least one of the primary membrane 8 and secondary membrane 5 comprises a plurality of metal sheets which are welded to each other. The sealing test method which will be described below is intended more specifically to test the sealing of the weld seams which enables the metal sheets to be connected to each other. According to an embodiment, the membrane to be tested has undulations which enable it to become deformed under the action of thermal and mechanical stresses generated by the fluid which is stored in the tank. To this end, as illustrated, for example, in FIG. 8, each metal sheet comprises two series of undulations which are perpendicular to each other.

In an embodiment, the sealing test method comprises three steps, that is to say:
 the diffusion of a tracer gas in a thermally insulating space which is covered by the membrane 5, 8 for which the sealing is intended to be tested;
 controlling the diffusion of the tracer gas in the thermally insulating space; and
 verifying the sealing of the weld seams of the membrane 5, 8.

In another embodiment, the sealing test method comprises only the verification of the sealing of the weld seams of the membrane 5, 8 without the use of a tracer gas.

The step of diffusing a tracer gas involves injecting a tracer gas into the thermally insulating space which is covered by the membrane 5, 8 for which it is desirable to verify the sealing. When it is desirable to verify the sealing of the secondary membrane 5, the tracer gas is injected into the secondary thermally insulating space. In this instance, the sealing test method is implemented before the primary thermally insulating barrier 7 and the primary membrane 8 are installed. When it is desirable to verify the sealing of the primary membrane 8, the tracer gas is injected into the primary thermally insulating space.

Figure 12:
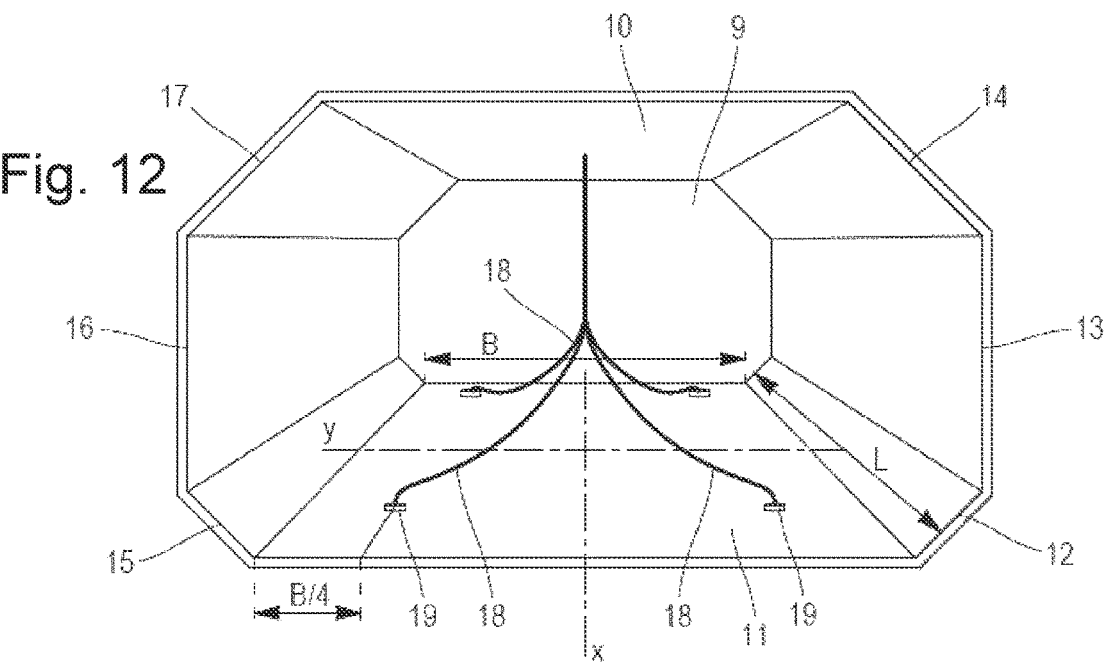
FIG. 12 is a partial schematic view of a sealed and thermally insulating tank illustrating tracer gas injection devices which are positioned through a membrane of the base wall of the tank.

FIG. 12 illustrates schematically a sealed and thermally insulating tank and a system for injecting tracer gas into a thermally insulating space.

The injection system comprises a plurality of conduits 18 which are, on the one hand, connected to a source of tracer gas which is not illustrated and, on the other hand, connected to tracer gas injection devices 19 which provide a passage for the injection of the tracer gas through the membrane 5, 8 whose sealing has to be tested. More specifically, the tracer gas injection devices 19 provide passages for tracer gas through the membrane of the base wall 11. Such an arrangement is particularly advantageous since the tracer gas has a lower vapor density than that of air so that it has a tendency to rise in the thermally insulating space. Consequently, the injection of the tracer gas from the bottom, through the membrane 5, 8 of the base wall 11 to be tested, enables a rapid and homogeneous diffusion of the tracer gas in the thermally insulating space.

In the embodiment illustrated in FIG. 12, the base wall 11 is provided with at least four tracer gas injection devices 19 which are regularly distributed over the surface of the base wall 11. The base wall 11 has a rectangular shape and can thus be divided into four equal surface zones via the two axes of symmetry x and y thereof. Each of the four tracer gas injection devices 19 is arranged in one of the four above-mentioned zones. In the specific embodiment illustrated, each tracer gas injection device 19 is arranged close to the center of the respective zone thereof. In a specific embodiment, each of the four tracer gas injection devices is arranged at a distance ¼ L from the adjacent longitudinal edge and is arranged at a distance ¼ B from the adjacent transverse edge, with L: the longitudinal dimension of the base wall 11 and B: the transverse dimension of the base wall 11.

The step of controlling the diffusion of tracer gas involves, when the tracer gas has diffused through the thermally insulating space, controlling the diffusion of the tracer gas in the thermally insulating space.

To this end, the gas contained in the thermally insulating space into which the tracer gas has been injected is removed using a plurality of gas removal devices which are provided through the membrane which covers the thermally insulating space. Each removal device is connected to an analysis equipment item, such as a mass spectrometer, which enables the presence and the concentration of the tracer gas to be verified in the corresponding zone of the thermally insulating space.

The step of verifying the weld seams involves using the leak detection device 54, which is described above, on one of the membranes 5, 8 of the sealed and thermally insulating tank.

Although the invention has been described in connection with several specific embodiments, it is evident that it is by no means limited thereto and that it comprises all the equivalent techniques of the means described and the combinations thereof if they are included within the scope of the invention.

The use of the verb "comprise", "have" or "include" and the conjugated forms thereof do not exclude the presence of other elements or steps other than those set out in a claim.

In the claims, any reference numeral in brackets should not be interpreted to be a limitation of the claim.

The invention claimed is:

1. A leak detection device for detecting a leak in a test zone of a sealing membrane of a sealed and thermally insulating tank, the leak detection device comprising:
a portable leak detection bell-like member, the leak detection bell-like member comprising a main body which is configured to be placed above the test zone and a sealing joint which is connected to the main body and which is configured to define a detection chamber between the main body and the test zone, the sealing joint being configured to come into contact with the sealing membrane and having a closed contour which surrounds the detection chamber, the detection bell-like member further comprising a carrying handle which is provided with a control member which can be manually activated to produce a control signal, the control member being positioned on or in the immediate vicinity of the carrying handle so as to be able to be activated by the hand of a user holding the carrying handle,
a gas suction circuit which is configured to connect the detection chamber to a vacuum pump, the gas suction circuit being provided with a controlled valve which can be switched into an open state to connect the detection chamber to the vacuum pump and a closed state to isolate the detection chamber from the vacuum pump, and
a control unit which is configured to switch the controlled valve in response to the control signal.

2. The device as claimed in claim 1, wherein the control unit is configured to switch the controlled valve alternately between the open state and the closed state in response to the control signal.

3. The device as claimed in claim 1, wherein the carrying handle is arranged on an upper surface of the detection bell-like member, which surface is directed in the opposite direction to the sealing lip.

4. The device as claimed in claim 1, wherein the controlled valve is carried by the detection bell-like member.

5. The device as claimed in claim 1, comprising a flexible electrical cable which connects the control unit to the detection bell-like member to transport the control signal(s) and/or an electrical power supply.

6. The device as claimed in claim 1, wherein the detection bell-like member further comprises a mechanical pressure means which is carried by the main body and which comprises at least one pressure element which is configured to apply to a portion of the sealing lip a pressure which is directed toward the membrane when the main body is arranged in the test zone.

7. The device as claimed in claim 1, wherein the controlled valve is a three-way valve which is configured to place the detection chamber in communication with the ambient atmosphere in the closed state.

8. The device as claimed in claim 1, wherein the sealing joint comprises a peripheral sealing lip which is configured to come into contact with the sealing membrane and which has a closed contour which surrounds the detection chamber.

9. The device as claimed in claim 1, wherein the control member is a first control member which can be manually activated to produce a first control signal and the detection bell-like member further comprises a second control member which can be manually activated to produce a second control signal, the control unit being configured to switch the controlled valve into the open state in response to the first control signal and into the closed state in response to the second control signal.

10. The device as claimed in claim 9, wherein the carrying handle is a first carrying handle and the detection bell-like member further comprises a second carrying handle which is provided with the second control member.

11. The device as claimed in claim 1, further comprising an analysis equipment item which is connected to the detection chamber by the gas suction circuit and a pressure sensor which is arranged to supply to the control unit a measurement signal which is representative of a pressure applied in the detection chamber, wherein the control unit is configured to determine that the pressure applied in the detection chamber is lower than a predefined pressure threshold and to activate the analysis equipment item in response.

12. The device as claimed in claim 11, wherein the pressure sensor is arranged on the detection bell-like member and in fluid communication with the detection chamber.

13. The device as claimed in claim 11, wherein the analysis equipment item comprises a mass spectrometer.

14. The device as claimed in claim 11, wherein the analysis equipment item is configured to detect a tracer gas.

15. The device as claimed in claim 11, wherein the analysis equipment item is configured to detect a component of the ambient air.

16. The device as claimed in claim 1, wherein the gas suction circuit comprises a flexible pipe which is connected to a gas outlet of the detection bell-like member.

17. The device as claimed in claim 16, wherein the gas suction circuit further comprises a three-way connection whose channels are connected to the flexible pipe, a vacuum pump and an analysis equipment item, respectively.

18. The device as claimed in claim 17, further comprising a movable carriage which carries the control unit, the vacuum pump and the analysis equipment item.

* * * * *